US009922271B2

(12) United States Patent
Kant

(10) Patent No.: US 9,922,271 B2
(45) Date of Patent: *Mar. 20, 2018

(54) OBJECT DETECTION AND CLASSIFICATION

(71) Applicant: Netra, Inc., Boston, MA (US)

(72) Inventor: Shashi Kant, Wellesley, MA (US)

(73) Assignee: NETRA, INC., Boston, MA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/147,598

(22) Filed: May 5, 2016

(65) Prior Publication Data

US 2016/0275376 A1 Sep. 22, 2016

Related U.S. Application Data

(63) Continuation-in-part of application No. 15/074,104, filed on Mar. 18, 2016, now Pat. No. 9,760,792.

(60) Provisional application No. 62/136,038, filed on Mar. 20, 2015, provisional application No. 62/158,884, filed on May 8, 2015.

(51) Int. Cl.

| | |
|---|---|
| ***G06K 9/48*** | (2006.01) |
| ***G06K 9/62*** | (2006.01) |
| ***G06K 9/20*** | (2006.01) |
| ***G06K 9/00*** | (2006.01) |

(52) U.S. Cl.

CPC ....... *G06K 9/6277* (2013.01); *G06K 9/00771* (2013.01); *G06K 9/209* (2013.01); *G06K 9/628* (2013.01)

(58) Field of Classification Search

CPC .... G06K 9/6277; G06K 9/628; G06K 9/6255; G06K 9/209; G06K 9/46; G06K 9/52; H04N 5/33; H04N 7/18

See application file for complete search history.

(56) References Cited

U.S. PATENT DOCUMENTS 6,625,310 B2 9/2003 Lipton et al.
6,696,945 B1 2/2004 Venetianer et al.
6,738,424 B1 5/2004 Allmen et al.
(Continued)

FOREIGN PATENT DOCUMENTS

WO WO-2016/033676 3/2016

OTHER PUBLICATIONS

International Search Report and Written Opinion for PCT/CA2014/050834 dated Mar. 11, 2015.
(Continued)

*Primary Examiner* — Amir Alavi
(74) *Attorney, Agent, or Firm* — Foley & Lardner LLP

(57) ABSTRACT

Object detection and across disparate fields of view are provided. A first image generated by a first recording device with a first field of view, and a second image generated by a second recording device with a second field of view can be obtained. An object detection component can detect a first object within the first field of view, and a second object within the second field of view. An object classification component can determine first and second level classification categories of the first object. Object components can correlate the first object with the second object based on the descriptor of the first object or a descriptor of the second object, and can determine a characteristic or the first object or the second object based on the correlation.

20 Claims, 10 Drawing Sheets

(56) References Cited

U.S. PATENT DOCUMENTS

| | | | |
|---|---|---|---|
| 6,954,498 | B1 | 10/2005 | Lipton |
| 6,970,083 | B2 | 11/2005 | Venetianer et al. |
| 6,987,883 | B2 | 1/2006 | Lipton et al. |
| 6,999,600 | B2 | 2/2006 | Venetianer et al. |
| 7,046,732 | B1 | 5/2006 | Slowe et al. |
| 7,224,852 | B2 | 5/2007 | Lipton et al. |
| 7,321,624 | B1 | 1/2008 | Allmen et al. |
| 7,391,907 | B1 | 6/2008 | Venetianer et al. |
| 7,424,167 | B1 | 9/2008 | Chosak et al. |
| 7,424,175 | B2 | 9/2008 | Lipton et al. |
| 7,583,815 | B2 | 9/2009 | Zhang et al. |
| 7,613,322 | B2 | 11/2009 | Yin et al. |
| 7,613,324 | B2 | 11/2009 | Venetianer et al. |
| 7,646,401 | B2 | 1/2010 | Lipton et al. |
| 7,733,369 | B2 | 6/2010 | Yin et al. |
| 7,796,780 | B2 | 9/2010 | Lipton et al. |
| 7,801,330 | B2 | 9/2010 | Zhang et al. |
| 7,822,275 | B2 | 10/2010 | Rasheed et al. |
| 7,825,954 | B2 | 11/2010 | Zhang et al. |
| 7,868,912 | B2 | 1/2011 | Venetianer et al. |
| 7,884,849 | B2 | 2/2011 | Yin et al. |
| 7,925,536 | B2 | 4/2011 | Lipton et al. |
| 7,932,923 | B2 | 4/2011 | Lipton et al. |
| 7,949,150 | B2 | 5/2011 | Haering et al. |
| 8,150,103 | B2 | 4/2012 | Zhang et al. |
| 8,180,490 | B2 | 5/2012 | Hassan-Shafique et al. |
| 8,189,964 | B2 | 5/2012 | Flynn et al. |
| 8,334,906 | B2 | 12/2012 | Lipton et al. |
| 8,370,869 | B2 | 2/2013 | Paek et al. |
| 8,405,720 | B2 | 3/2013 | Gupta et al. |
| 8,526,678 | B2 | 9/2013 | Liu et al. |
| 8,589,410 | B2 | 11/2013 | Sud et al. |
| 8,625,907 | B2 | 1/2014 | Zitnick et al. |
| 9,204,107 | B2 | 12/2015 | Yin et al. |
| 9,349,076 | B1 * | 5/2016 | Liu ...................... G06K 9/6256 |
| 2006/0133699 | A1 | 6/2006 | Widrow et al. |
| 2010/0177968 | A1 * | 7/2010 | Fry ...................... A61B 5/0452 382/224 |
| 2011/0125735 | A1 | 5/2011 | Petrou |
| 2011/0167053 | A1 | 7/2011 | Lawler et al. |
| 2012/0054177 | A1 | 3/2012 | Wang et al. |
| 2012/0155709 | A1 * | 6/2012 | Steinberg ........... G06K 9/00228 382/103 |
| 2012/0221572 | A1 | 8/2012 | Wang et al. |
| 2012/0243789 | A1 | 9/2012 | Yang et al. |
| 2013/0114900 | A1 | 5/2013 | Vedantham et al. |
| 2013/0138636 | A1 | 5/2013 | Jin |
| 2014/0074852 | A1 | 3/2014 | Sud et al. |
| 2014/0334721 | A1 * | 11/2014 | Cervin ............... G06K 9/00483 382/160 |
| 2015/0131851 | A1 * | 5/2015 | Bernal ............... G06K 9/00711 382/103 |
| 2015/0227557 | A1 * | 8/2015 | Holzschneider .. G06F 17/30256 382/218 |
| 2015/0324656 | A1 * | 11/2015 | Marks ................... G01J 5/0025 383/103 |
| 2016/0275375 | A1 * | 9/2016 | Kant .................... G06K 9/4604 |
| 2016/0275376 | A1 * | 9/2016 | Kant .................... G06K 9/6277 |
| 2017/0011520 | A1 * | 1/2017 | Mathew ............... G06K 9/6218 |

OTHER PUBLICATIONS

Information Retrieval: Implementing and Evaluating Search Engines, MIT Press, 2010.

Tao, Y.K., "Inverted Indexes: The Basic," May 14, 2013 (14 pages).

* cited by examiner

OBJECT DETECTION AND CLASSIFICATION

CROSS-REFERENCES TO RELATED APPLICATIONS

This application claims the benefit of priority of U.S. provisional application 62/158,884, filed May 8, 2015 and titled "Activity Recognition in Video," and claims the benefit of priority as a continuation-in-part of U.S. patent application Ser. No. 15/074,104, filed Mar. 18, 2016 and titled "Object Detection and Classification," which claims the benefit of priority of U.S. provisional application 62/136,038, filed Mar. 20, 2015 and titled "Multi-Camera Object Tracking and Search," each of which is incorporated by reference herein in their entirety.

BACKGROUND

Digital images can include views of various objects from various perspectives. The objects can be similar or different in size, shape, motion, or other characteristics.

SUMMARY

At least one aspect is directed to a system of object detection across disparate fields of view. The system includes a data processing system having at least one of an object detection component, an object classification component, an object forecast component, and an object matching component. The data processing system can obtain a first image generated by a first recording device, the first recording device having a first field of view. The object detection component of the data processing system can detect, from the first image, a first object present within the first field of view. The object classification component of the data processing system can determine a first level classification category of the first object and determines a second level classification category of the first object. The data processing system can generate a descriptor of the first object based on at least one of the first level classification category of the first object and the second level classification category of the first object. The data processing system can obtain a second image generated by a second recording device, the second recording device having a second field of view different than the first field of view. The object detection component of the data processing system can detect, from the second image, a second object present within the second field of view. The data processing system can generate a descriptor of the second object based on at least one of a first level classification category of the second object and a second level classification category of the second object. The object matching component of the data processing system can identify a correlation of the first object with the second object based on the descriptor of the first object and the descriptor of the second object. The object forecast component of the data processing system can determine a characteristic of at least one of the first object and the second object based on the correlation of the first object with the second object.

At least one aspect is directed to a method of digital image object analysis across disparate fields of view. The method can include obtaining, by a data processing system having at least one of an object detection component, an object classification component, an object forecast component, and an object matching component, a first image generated by a first recording device, the first recording device having a first field of view. The method can include detecting, by the object detection component of the data processing system, from the first image, a first object present within the first field of view. The method can include determining, by the object classification component of the data processing system, a first level classification category of the first object and a second level classification category of the first object. The method can include generating, by the data processing system, a descriptor of the first object based on at least one of the first level classification category of the first object and the second level classification category of the first object. The method can include obtaining, by the data processing system, a second image generated by a second recording device, the second recording device having a second field of view different than the first field of view. The method can include detecting, by the object detection component of the data processing system, from the second image, a second object present within the second field of view, and generating, by the data processing system, a descriptor of the second object based on at least one of a first level classification category of the second object and a second level classification category of the second object. The method can include identifying, by the object matching component of the data processing system, a correlation between the first object and the second object based on the descriptor of the first object and the descriptor of the second object. The method can include determining, by the object forecast component of the data processing system, a characteristic of at least one of the first object and the second object based on the correlation between the first object and the second object.

At least one aspect is directed to a method of providing a data processing system for object detection across disparate fields of view. The data processing system includes at least one of an object detection component, an object classification component, an object forecast component, and an object matching component. The data processing system can obtain a first image generated by a first recording device, the first recording device having a first field of view. The object detection component of the data processing system can detect, from the first image, a first object present within the first field of view. The object classification component of the data processing system can determine a first level classification category of the first object and determines a second level classification category of the first object. The data processing system can generate a descriptor of the first object based on at least one of the first level classification category of the first object and the second level classification category of the first object. The data processing system can obtain a second image generated by a second recording device, the second recording device having a second field of view different than the first field of view. The object detection component of the data processing system can detect, from the second image, a second object present within the second field of view. The data processing system can generate a descriptor of the second object based on at least one of a first level classification category of the second object and a second level classification category of the second object. The object matching component of the data processing system can identify a correlation of the first object with the second object based on the descriptor of the first object and the descriptor of the second object. The object forecast component of the data processing system can determine a characteristic of at least one of the first object and the second object based on the correlation of the first object with the second object.

At least one aspect is directed to a computer readable storage medium storing instructions that when executed by one or more data processors, cause the one or more data processors to perform operations. The operations can include obtaining a first image generated by a first recording device, the first recording device having a first field of view, and detecting from the first image, a first object present within the first field of view. The operations can include determining a first level classification category of the first object and a second level classification category of the first object. The operations can include generating a descriptor of the first object based on at least one of the first level classification category of the first object and the second level classification category of the first object, and obtaining a second image generated by a second recording device, the second recording device having a second field of view different than the first field of view. The operations can include detecting from the second image, a second object present within the second field of view. The operations can include generating a descriptor of the second object based on at least one of a first level classification category of the second object and a second level classification category of the second object. The operations can include identifying a correlation between the first object and the second object based on the descriptor of the first object and the descriptor of the second object. The operations can include determining, by the object forecast component, a characteristic of at least one of the first object and the second object based on the correlation between the first object and the second object.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of systems, devices, apparatuses, and methods of digital image object detection or tracking across disparate fields of view. The technical solution described herein includes an object detection component (e.g., that includes hardware) that detects, from a first image, a first object within the field of view of a first recording device. Using, for example, a locality sensitive hashing technique and an inverted index central data structure, an object classification component can determine hierarchical classification categories of the first object. For example, the object classification component can detect the first object and classify the object as a person (a first level classification category) wearing a green sweater (a second level classification category). A data processing system that includes the object classification component can generate a descriptor for the first object, e.g., a descriptor indicating that the object may be a person wearing a green sweater, and can create a data structure indicating a probability identifier for the descriptor. For example, the probability identifier can indicate that there is a 75% probability that the object is a person wearing a green sweater.

The object detection component can also detect a second object within the field of view of the same recording device or of a second recording device, and can similarly analyze the second object to determine hierarchical classification categories, descriptors, and probability identifiers for the second object. An object matching component utilizing, e.g., locality sensitive hashing and the inverted index central data structure, can correlate the first object with the second object based on their respective descriptors. For example, the object matching component can determine (or determine a probability) that the first object and the second object are a same object. An object forecast component can determine a characteristic of the first object or the second object (or other object) based on the correlation between the first and second object. For example, the object forecast component of the data processing system can determine that the first and second objects are a same object that is part of a group or family unit with a third object, (e.g., a parent and a child).

Among other data output, the data processing system that includes these and other components can also generate tracks on displays that indicate where, within the fields of view of the respective images, the object traveled; and can generate a display including these tracks and other information about objects such as a predictive behavioral activity of one or more of the objects.

Figure 1:
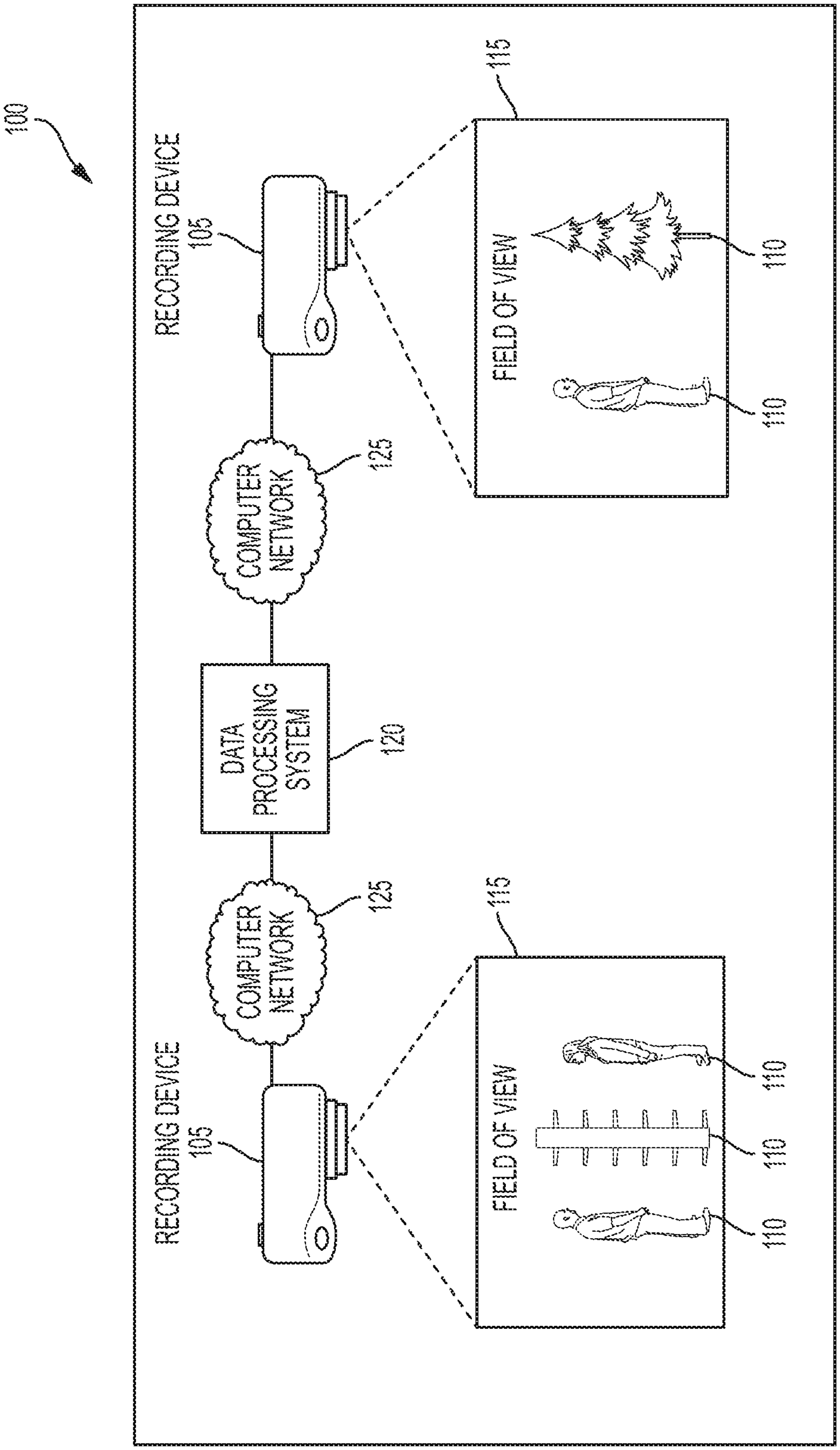
FIG. 1 is a functional diagram depicting one example environment for object detection, according to an illustrative implementation.
Figure 2:
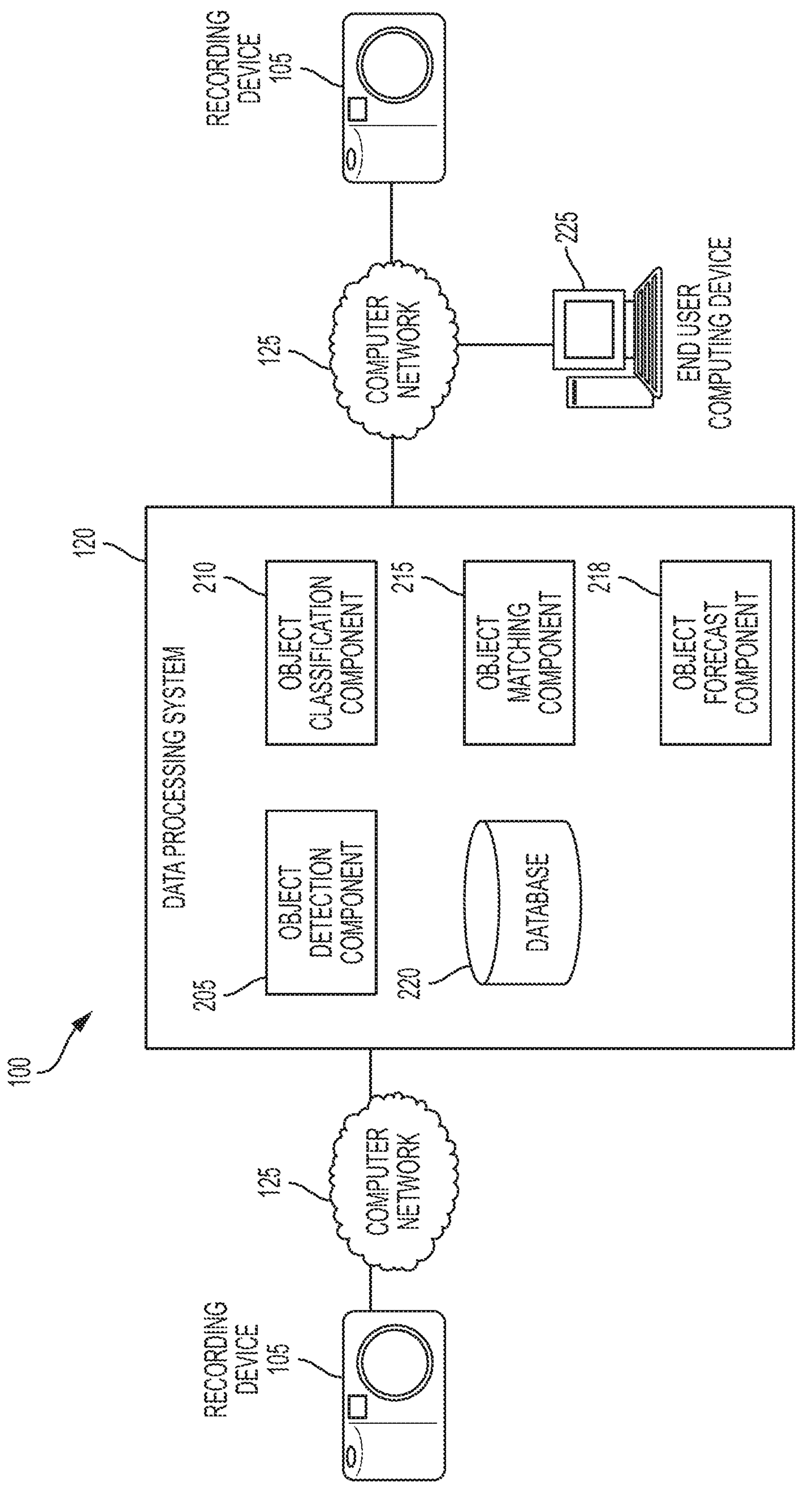
FIG. 2 is a block diagram depicting one example environment for object detection, according to an illustrative implementation.

FIG. 1 and FIG. 2 illustrate an example system 100 of object detection across different fields of view. Referring to FIG. 1 and FIG. 2, among others, the system 100 can be part of an object detection or tracking system that, for example, identifies or tracks at least one object that appears in multiple different video or still images. The object detection or tracking system can also determine associations or relationships between objects. For example, the system 100 can determine that multiple different people (objects) are part of the same family or group unit. The object detection or tracking system can also identify characteristics such as predictive behaviors of one or more of the objects. The predictive behaviors can include predicted future locations of the objects (e.g., based on a direction of motion or other criteria such as a relationship between objects or a present location of an object) as well as other activity associated with one or more objects. The system 100 can include at least one recording device 105, such as a video camera, surveillance camera, still image camera, digital camera, or other computing device (e.g., laptop, tablet, personal digital assistant, or smartphone) with video or still image creation or recording capability.

The objects 110 present in the video or still images can include background objects or transient objects. The background objects 110 can include generally static or permanent objects that remain in position within the image. For example, the recording devices 105 can be present in a department store and the images created by the recording devices 105 can include background objects 110 such as clothing racks, tables, shelves, walls, floors, fixtures, goods, or other items that generally remain in a fixed location unless disturbed. In an outdoor setting, the images can include, among other things, background objects such as streets, buildings, sidewalks, utility structures, or parked cars. Transient objects 110 can include people, shopping carts, pets, or other objects (e.g., cars, vans, trucks, bicycles, or animals) that can move within or through the field of view of the recording device 105.

The recording devices 105 can be placed in a variety of public or private locations and can generate or record digital images of background or transient objects 110 present with the fields of view of the recording devices 105. For example, a building can have multiple recording devices 105 in different areas of the building, such as different floors, different rooms, different areas of the same room, or surrounding outdoor space. The images recorded by the different recording devices 105 of their respective fields of view can include the same or different transient objects 110. For example, a first image (recorded by a first recording device 105) can include a person (e.g., a transient object 110) passing through the field of view of the first recording device 105 in a first area of a store. A second image (recorded by a second recording device 105) can include the same person or a different person (e.g., a transient object 110) passing through the field of view of the second recording device 105 in a second area of a store.

The images, which can be video, digital, photographs, film, still, color, black and white, or combinations thereof, can be generated by different recording devices 105 that have different fields of view 115, or by the same recording device 105 at different times. The field of view 115 of a recording device 105 is generally the area through which a detector or sensor of the recording device 105 can detect light or other electromagnetic radiation to generate an image. For example, the field of view 115 of the recording device can include the area (or volume) visible in the video or still image when displayed on a display of a computing device. The different fields of view 115 of different recording devices 105 can partially overlap or can be entirely separate from each other.

The system 100 can include at least one data processing system 120. The data processing system 120 can include at least one logic device such as a computing device or server having at least one processor to communicate via at least one computer network 125, for example with the recording devices 105. The computer network 125 can include computer networks such as the internet, local, wide, metro, private, virtual private, or other area networks, intranets, satellite networks, other computer networks such as voice or data mobile phone communication networks, and combinations thereof.

For example, FIG. 1 depicts two fields of view 115. A first field of view 115 is the area that is recorded by a first recording device 105 and includes three objects 110. For example, this field of view can be in a store. Two of the objects 110 are people, a man and a woman are transient objects that can move within and outside of the field of view 115. The third object 110 is a shelf, e.g., a background object generally in a fixed location. The recording device 105 trained on this field of view 115 can record activity in the area of the shelf. FIG. 1 also depicts, as an example, a second field of view 115. This second field of view 115 can be a view of an outdoor area behind the store, and in the example of FIG. 1 includes two objects 110—a man (a transient object) and a tree (a background object). The two fields of view 115 in this example do not overlap. As described herein, the data processing system 120 can determine that the man (an object 110) present in an image of the first field of view 115 in the store is, or is likely to be, the same man present in an image of the second field of view 115 outside, near the tree.

The data processing system 120 can include at least one server or other hardware. For example, the data processing system 120 can include a plurality of servers located in at least one data center or server farm. The data processing system 120 can detect, track, match, correlate, or determine characteristics for various objects 110 that are present in images created by one or more recording devices 105. The data processing system 120 can also include personal computing devices, desktop, laptop, tablet, mobile, smartphone, or other computing devices. The data processing system 120 can create documents indicating tracks of objects 110, characteristics of objects 110, or other information about objects 110 present in the images.

The data processing system 120 can include at least one object detection component 205, at least one object classification component 210, at least one object matching component 215, at least one object forecast component 218, or at least one database 220. The object detection component 205, object classification component 210, object matching component 215, or object forecast component 218 can each include at least one processing unit, appliance, server, virtual server, circuit, engine, agent, or other logic device such as programmable logic arrays, hardware, software, or hardware and software combinations configured to communicate with the database 220 and with other computing devices (e.g., the recording devices 105, end user computing devices 225 or other computing device) via the computer network 125. The data processing system 120 can be or include a hardware system having at least one processor and memory unit and including the object detection component 205, object classification component 210, object matching component 215, and object forecast component 218.

The object detection component 205, object classification component 210, object matching component 215, or object forecast component 218 can include or execute at least one computer program or at least one script. The object detection component 205, object classification component 210, object matching component 215, or object forecast component 218 can be separate components, a single component, part of or in communication with a deep neural network, or part of the data processing system 120. The object detection component 205, object classification component 210, object matching component 215, or object forecast component 218 can include combinations of software and hardware, such as one or more processors configured to detect objects 110 in images from recording devices 105 that have different fields of view, determine classification categories for the objects 110, generate descriptors (e.g., feature vectors) of the objects 110 based on the classification categories, determine probability identifiers for the descriptors, correlate objects 110 with each other, and determine characteristics of the objects 110.

The object detection component 205, object classification component 210, object matching component 215, or object forecast component 218 can be part of, or can include scripts executed by, the data processing system 120 or one or more servers or computing devices thereof. The object detection component 205, object classification component 210, object matching component 215, or object forecast component 218 can include hardware (e.g., servers) software (e.g., program applications) or combinations thereof (e.g., processors configured to execute program applications) and can execute on the data processing system 120 or the end user computing device 225. For example, the end user computing device 225 can be or include the data processing system 120; or the data processing system 120 can be remote from the end user computing device 225 (e.g., in a data center) or other remote location.

The object detection component 205, object classification component 210, object matching component 215, or object forecast component 218 can communicate with each other, with the database 220, or with other components such as the recording devices 105 or end user computing devices 225 via the computer network 125, for example. The database 220 can include one or more local or distributed data storage units, memory devices, indices, disk, tape drive, or an array of such components.

The end user computing devices 225 can communicate with the data processing system 120 via the computer network 125 to display data such as content provided by the data processing system 120 (e.g., video or still images, tracks of objects 110, data about objects 110 or about the images that include the objects 110, analytics, reports, or other information). The end user computing device 225 (and the data processing system 120) can include desktop computers, laptop computers, tablet computers, smartphones, personal digital assistants, mobile devices, consumer computing devices, servers, clients, and other computing devices. The end user computing device 225 and the data processing system 120 can include user interfaces such as microphones, speakers, touchscreens, keyboards, pointing devices, a computer mouse, touchpad, or other input or output interfaces.

The system 100 can be distributed. For example, the recording devices 105 can be in one or more than one area, such as one or more streets, parks, public areas, stores, shopping malls, office environments, retail areas, warehouse areas, industrial areas, outdoor areas, indoor areas, or residential areas. The recording devices 105 can be associated with different entities, such as different stores, cities, towns, or government agencies. The data processing system 120 can include a cloud-based distributed system of separate computing devices connected via the network 125, or consolidated computing devices for example in a data center. The data processing system 120 an also consist of a single computing device, such as a server, personal computer, desktop, laptop, tablet, or smartphone computing device. The data processing system 120 can be in the same general location as the recording devices 105 (e.g., in the same shopping mall; or in a back room of a department store that includes recording devices 105), or in a separate location remote from the recording device location. The end user computing device 225 can be in the same department store, or at a remote location connected to the data processing system 120 via the computer network 125. The end user computing device 225 can be associated with a same entity as the recording devices 105, such as a same store. Different recording devices 105 can also be located in different areas that may or may not have an overt relationship with each other and need not be associated with the same entity. For example, a first recording device 105 can be located at a public park of a city; and a second recording device 105 can be located in a subway station of the same or a different city. The recording devices 105 can also include mobile devices operated by the same or different people in different areas, e.g., smartphones, and can be carried by people or fixed to vehicles (e.g., a dashcam).

The system 100 can include at least one recording device 105 to detect objects 110. For example, the system 100 can include two or more recording devices 105 to detect objects from digital images that represent disparate fields of view of the respective recording devices 105. The disparate fields of view 115 can at least partially overlap or can be entirely different. The disparate fields of view 115 can also represent different angles of the same area. For example, one recording device 105 can record images from a top or birds eye view, and another recording device 105 can record images of the same area and have the same field of view, but from a street level or other perspective view that is not a top view.

The data processing system 120 can obtain an image generated by a first recording device 105. For example, the first recording device 105 can be one of multiple recording devices 105 installed in a store and can generate an image such as a video image within a field of view that includes a corridor and some shelves. The data processing system 120 (e.g., located in the back room of the store or remotely) can receive or otherwise obtain the images from the first recording device 105 via the computer network 125. The data processing system 120 can obtain the images in real time or at various intervals, such as hourly, daily, or weekly via the computer network 125 or manually. For example, a technician using a hardware memory device such as a USB flash drive or other data storage device can retrieve the image(s) from the recording device 105 and can provide the images to the data processing system 120 with the same hardware memory device. The images can be stored in the database 220.

The data processing system 120 can by need not obtain the images directly (or via the computer network 125) from the recording devices 105. In some instances the images can be stored on a third party device between recording by the recording devices 105 and receipt by the data processing system 120. For example, the images created by the recording device 105 can be stored on a server that is not the recording device 105 and available on the internet. In this example, the data processing system 120 can obtain the image from an internet connected database rather than from the recording device 105 that generated the image.

The data processing system 120 can detect, from a first image obtained from a first recording device 105, at least one object present within the field of view 115 of the first image. For example, the object detection component 205 can evaluate the first image, e.g., frame by frame, using video tracking or another object recognition technique. The object detection component 205 can analyze multiple frames of the image, in sequence or out of sequence, using kernel based or shift tracking based on a maximization of a similarity measure of objects 110 present in the image, using contour based tracking that includes edge or boundary detection of objects 110 present in the image, or using other target representation or localization measures. In some implementations, from a multi-frame analysis of the first image (or any other image) the data processing system 120 can determine that the first image includes a background object that is at least partially blocked or obscured by a transient object that passes in front of the background object, e.g., between the background object and the recording device 105 that generates the image.

The object detection component 205 can also detect movement of an object 110 relative to background or other objects in the image from a first frame of the image to a second frame of the image. For example, the data processing system 120 can obtain a first image from a first recording device 105 in a store that includes within its field of view 115 a corridor and a shelf. From analysis of the first image, the object detection component 205 can identify a first object 110 such as a person present in the corridor. The object 110, or a particular instance of an object in an image, may be referred to as a blob or blob image.

The object detection component 205 can evaluate the image (e.g., a still image or a frame of a video image) and transform Cartesian coordinates of the image to log-polar coordinates. For example, the data processing system 120 can scan the image for each pixel with x,y coordinate and transform the coordinates for each pixel to Cartesian ρ,θ coordinates. The log-polar transform, as a reversible two way transform, can accommodate for images that are distorted by recording devices 105 that include wide angle or fisheye lenses. The transform acts as a correction mechanism that allows for object 110 detection. For example, the object detection component 205 can use calibration techniques to construct a distortion model of a lens of the recording device 105. The object detection component 205 can also read images, including video frames, and can adjust transform parameters based on the distortion model to output the transformed image for further analysis.

The data processing system 120 can determine one or more classification categories for the object 110. The classification categories can include a hierarchical or vertical classification of the object. For example, the object classification component 210 can determine a first level classification category of the object 110. Referring to the example immediately above, the first level classification category can indicate that the object 110 is a male or an adult human male.

For example, the object classification component 210 can query or compare the object 110 (e.g., a blob or blob image) against a convolutional neural network (CNN), recurrent neural network (RNN), other artificial neural network (ANN), or against a spatio-temporal memory network (that can be collectively referred to as a deep neural network (DNN)) that has been previously trained, for example to recognize humans and associated gender. In some implementations, the DNN has been trained with samples of males and females of various age groups. The DNN can be part of the data processing system 120, e.g., that utilizes the database 220, or a separate system in communication with the data processing system 120, for example via the computer network 125. The result of the comparison of the object 110 with the DNN can indicate that the object 110 is, for example, a male. The object classification component 210 can provide this information—e.g., a first level classification category—as output that can be stored in the database 220 and accessed by the data processing system components to correlate the object 110 having this first level classification category with other objects 110 that also have the first level classification category (e.g., descriptor) of, for example, "male".

The object classification component 210 can also determine a second level classification category for the object 110. The second level classification category can include a sub-category of the object 110. For example, when the first level classification category indicates that the object 110 is a human male, the second level classification category can indicate that the object is a man, or a male child or other characteristic, such as a man wearing a hat or a jacket. The second level classification category can include other characteristics, such as indicators of height, weight, hair style, or indicators of the physical appearance of the man.

For example, the object classification component 210 can implement a secondary or second level query or comparison of the object 110 (e.g., the blob) against the Deep Neural Network (DNN), which has been previously trained, for example to recognize clothing, associated fabrics or accessories. The clothing recognition capabilities of the DNN can result from previous training of the DNN with, for example, various samples of clothes or accessories. The DNN output can indicate, for example, the second level classification category of the object 110 wearing a jacket. The object classification component 210 can provide this information—e.g., a second level classification category—as output that can be stored in the database 220 and accessed by the data processing system components to correlate the object 110 having this second level classification category with other objects 110 that also have the second level classification category of, for example, "wearing a jacket". The DNN can be similarly trained and analyzed by the object classification component 210 to determine third or higher level (e.g., more fine grained) classification categories of the objects 110. In some implementations, the object classification component 210 includes or is part of the DNN.

The data processing system 120 can determine more or less than two classification categories. For example, the object classification component 210 can determine a third level classification category, e.g., that the jacket indicated by the second level classification category is green in color. The classification categories can be hierarchical, where for example the second level classification category is a subset or refinement of the first level classification category. For example, the object classification component 210 can determine the second level classification category of the object 110 from a list of available choices or verticals (e.g., obtained from the database 220) for or associated with the first level classification category. For example, the first level classification category may be "person"; and a list of potential second level categories may include "man", "woman", "child", "age 20-39", "elderly", "taller than six feet", "athletic build", "red hair", or other characteristic relevant to the first level classification category of "person". These characteristics can be considered sub-categories of the first level classification category. In this and other examples, the object classification component 210 determines the second level classification category of the object 110 from the first level classification category of the same object 110. Each classification level category can represent a more fine grained or detailed elaboration, e.g., "red hair" of the previous (coarser) classification level, e.g., "person". The classification category levels can also be non-hierarchical, where they different classification level categories represent different or unrelated characteristics of the object 110.

The data processing system 120 can generate at least one descriptor (e.g., a feature vector) for the object(s) 110 present, for example, in a first image obtained from a first recording device 105. The descriptor can be based on or describe the first, second, or other level classification categories for the detected objects 110. For example, when the first level classification category is "human male" and the second level classification category is "green jacket" the object classification component 210 can generate a descriptor indicating that the object 110 is (or is likely to be) a man wearing a green jacket.

The classification categories and descriptors associated with detected objects 110 can be stored as data structures (e.g., using locality-sensitive hashing (LSH) as part of an index data structure or inverted index) in the database 220 and can be accessed by components of the data processing system 120 as well as the end user computing device 225. For example, the object classification component 210 can implement a locality-sensitive hashing technique (e.g., MinHash) to hash the descriptors so that similar descriptors map to similar indexes (e.g., buckets or verticals) within the database 220, which can be a single memory unit or distributed database within or external to the data processing system 120. Collisions that occur when similar descriptors are mapped by the object classification component 210 to similar indices can be used by the data processing system 120 to detect matches between objects 110, or to determine that an object 110 present in two different images is, or is likely to be, a same object such as an individual person. In addition or as an alternative to locality-sensitive hashing, the object classification component 210 can implement data clustering or nearest neighbor techniques to classify the descriptors.

Feature vectors or other descriptors can also be converted by the data processing system 120 (e.g., by the object detection component 205 or the object classification component 210) to a string representation. N-grams of the descriptors can be stored in an inverted index (e.g., in the database 220) to allow for search based information retrieval techniques (by the data processing system 120) such as term frequency-inverse document frequency (Tf-IDF) techniques. For example, a descriptor can be represented as an integer array, e.g., a 10 dimensional int[ ] {0,1,3,4,5,7,9,8,4,7}. The data processing system 120 can convert this into a concatenated string representation of the numbers "0134579847". This string can be converted by the data processing system into n-grams of various values of n. For example, 4-grams of the above string can include "013", "134", or "345", among others. The data processing system 120 can create, access, or use other string representations such as hexadecimal representations, base-62, or base-64 representations of the descriptors. Representing the descriptors as searchable strings in inverted index facilitates scalability when implementing a k-nearest neighbor technique for pattern recognition within the data. This can reduce processing requirements and decrease latency of the data processing system 120.

The object classification component 210, using log-polar transform data, can create rotational or scale invariant descriptors for an image. Shapes, edges, colors, textures, or motion descriptors can be extracted from the log-polar images. The descriptors can also include histogram of oriented gradients (HoG) feature descriptors, edge orientation histograms, color histograms, or scale-invariant feature transform descriptors for the purpose of object detection or identification. The descriptors can be multimedia content descriptors and can include structural or edge descriptors for the images. With the enhancement of shape and structure information, edge descriptors or other feature descriptors associated with wide angle of fisheye lenses can resemble descriptors in normal view angle images. In this example, the Cartesian to log-polar transform provides techniques that exploit the descriptors so that objects can be identified, described, tracked, or characterized across using LSH techniques applied to normal or distorted (e.g., wide angle) fields of view 115, for example without applying de-warping techniques to any images or associated data. The descriptors can be stored in at least one index, e.g. in the database 220. The index representation of the descriptors can include a set of pixels that depicts one or more edges or boundary contours of an image. For example, the data processing system 120 can segment the image into a plurality of image segments, and can perform a multi-phase contour detection on each segment. The segmentation can be performed by the data processing system 120 using motion detection, background subtraction, object persistence in multiple channels, (e.g., via hue, saturation, brightness-value (HSV), red, green, blue (RGB), luminance-chrominance (YCbCr), pixel filtering in channels to reduce noise, background removal, or contour detection).

The object classification component 210 or other data processing system 120 component can create a probability identifier represented by a data structure that indicates a probability that the information indicated by the descriptor is accurate. For example, the probability identifier can indicate a 75% likelihood or probability that the object 110 is an adult male with a green jacket. For example, the data processing system 120 or the DNN can include a softmax layer, (e.g., a normalized exponential or other logistic function) that normalizes the inferences of each of the predicted classification categories (e.g., age_range:adult, gender:male, clothing:green_jacket that indicates three classification level categories of an adult male wearing a green jacket). The data processing system 120 can estimate the conditional probability using, for example, Bayes' theorem or another statistical inference model. The object classification component 210 can estimate the combined probability of the classification categories using a distance metric such as Cosine similarity between the object 110's descriptor set and a median of the training images descriptors and the estimated probability. For example, implementing the above techniques, the object classification component 210 can determine a 75% likelihood (e.g., a probability identifier or similarity metric) that a particular object 110 is an adult male wearing a green jacket. This information can be provided to the database 220 where it can be accessed by the data processing system 120 to correlate this particular object with another object 110.

The system 100 can include multiple recording devices 105 distributed throughout a store, for example. Transient objects 110, such as people walking around, can be present within the fields of view of different recording devices 105 at the same time or different times. For example, the man with the green jacket can be identified within an image of a first recording device 105, and subsequently can also be present within an image of a second recording device 105. The data processing system 120 can determine a correlation between objects 110 present in multiple images obtained from different recording devices 105. The correlation can indicate that the object 110 in a first image and the object 110 in a second image are (or are likely to be) the same object, e.g., the same man wearing the green jacket.

The images from the first recording device 105 and the second recording device 105 (or additional recording devices 105) can be the same or different types of images. For example, the first recording device 105 can provide video images, and the second recording device 105 can provide still photograph images. The data processing system 120 can evaluate images to correlate objects 110 present in the same or different types of images from the same or different recording devices 105. For example, the image data feeds obtained by the data processing system 120 from different sources such as different recording devices 105 can include different combinations of data formats, such as video/video feeds, video/photo, photo/photo, or photo/video. The video can be interlaced or non-interlaced video. Implementations involving two recording devices 105 are examples. The data processing system 120 can detect, track, correlate, or determine characteristics for objects 110 identified in images obtained from exactly one, two, or more than two recording devices 105. For example, a single recording device 105 can create multiple different video or still images of the same field of view 115 or of different fields of view at different times. The data processing system 120 can evaluate the multiple images created by a single recording device 105 to detect, classify, correlate, or determine characteristics for objects 110 present within these multiple images.

For example, once a new object 110 is detected in the field of view 115 of one of the recording devices 105, the data processing system 120 (or component such as the object matching component 120) can use tags for the new object 120 determined from the DNN and descriptors (e.g., feature vectors) to query an inverted index and obtain a candidate matching list of other objects 110 ordered by relevance. The data processing system 120 can perform a second pass comparison with the new object 110, for example using a distance metric such as Cosine similarity. If, for example, the similarity between the new object 110 and another object 110 exceeds a set threshold value (e.g., 0.5 or other value) the object matching component 120 can determine or identify a match between the two objects 110.

For example, having identified the object 110 as a man with the green jacket in the first image (e.g., in a first area of a store), the data processing system 120 can obtain a second image generated by a second recording device 105, e.g., in a second area of a store. The field of view of the second image and the field of view of the first image can be different fields of view. The object detection component 205 can detect at least one object 110 in the second image using for example the same object detection analysis noted above. As with the first object 110, the data processing system 120 can generate at least one descriptor of the second object. The descriptor of the second object can be based on first level, second level, or other level classification categories of the second object 110.

For example, the first level classification category of the object 110 can indicate that the object 110 is a male; and the second level classification category can indicate that the object 110 is wearing a green jacket. In this example, the descriptor can indicate that the second object 110 is a male wearing a green jacket. The data processing system 120 can also determine a probability identifier for the second object 110, indicating for example a 90% probability or likelihood that the second object 110 is a male wearing a green jacket. The data processing system 120 can create a data structure that represents the probability identifier and can provide the same to the database 120 for storage. A similarity metric can indicate that the probability that the object 110 is similar to another, previously identified object 110, and therefore a track is identified. The similarity metric can be extended to include a score obtained by the search result using the tags provided by the DNN.

The object matching component 215 can correlate the first object 110 with the second object 110. The correlation can indicate that the first object 110 and the second object 110 are a same object, e.g., the same man wearing the green jacket. For example, the object matching component 215 can correlate or match the first object 110 with the second object 110 based on the descriptors, classification categories, or probability identifiers of the first or second objects 110.

The correlation, or determination that an object 110 present in different images of different fields of views generated by different recording devices 105, can be based on matches between different classification category levels associated with the object 110. For example, the object matching component 215 can identify a correlation based exclusively on a match between the first level classification category of an object 110 in a first image and an object 110 in a second image. For example, the object 110 present in both images may have the first level classification category of "vehicle". The object matching component 215 can also identify the correlation based on a match of both first and second (or more) level classification categories of the object 110. For example, the object 110 present in two or more images may have the first and second level classification categories of "vehicle; motorcycle". In some instances, the correlation can be based exclusively on a match between second level categories of the object 110, e.g., (solely based on "motorcycle"). The object matching component 215 can identify correlations between objects 110 in multiple images based on matches between any level, a single level, or multiple levels of classification categories. In some implementations, the object matching component 215 can identify the same object 110, such as a vehicle, across greater than a threshold number of images (e.g., at least 5 images, or at least 15 images). Based on this enhanced level of activity, the data processing system 120 can identify the vehicle as an active object of interest. The data processing system 120 can then identify other objects that interact with the vehicle, such as a person entering or exiting the vehicle, or a second vehicle that is determined by the data processing system 120 to be following the vehicle that is the active object of interest.

Relative to a multi-level (or higher level such as second level or beyond) classification categories, the data processing system 120 that identifies the correlation between objects 110 can conserve processing power or bandwidth by limiting evaluation to a single or lower or coarser (e.g., first) level classification category as fewer search, analysis, or database 220 retrieval operations are performed. This can improve operation of the system 100 including the data processing system 120 by reducing latency and bandwidth for communications between the data processing system 120 or its components and the database 220 (or with the end user computing device 225, and minimizes processing operations of the data processing system 120, which reduces power consumption.

The data processing system 120 can correlate objects 110 that can be present in different images captured by different recording devices 105 at different times by, for example, comparing first and second (or any other level) classification categories of various objects 110 present in images created by different recording devices 105. In some implementations, the data processing system 120 (or component thereof such as the object matching component 215) can parse through the database 220 (an inverted index data structure) to identify matches in descriptors or probability identifiers associated with identified objects 110. These objects 110 may be associated with images taken from different recording devices 105. In some implementations, in an iterative or other process of correlating objects, the data processing system 120 can determine that an object 110 present in an image of one recording device 105 is more closely associated with an object 110 (that may be the same object) present in an image of a second recording device 105 than with a third recording device 105. In this example, further data or images from the third recording device can be ignored when continuing to identify correlations between objects. This can reduce latency and improve performance (e.g., speed) of the data processing system 120 in identifying correlations between objects.

The data processing system 120 components such as the object classification component 120 or the object matching component 215 can receive feature vectors of other descriptors created by the object detection component 205 as input, e.g., via the database 220. The object matching component 215 can identify an object 110 as an object of interest by detecting the object 110 in multiple images.

Figure 3A:
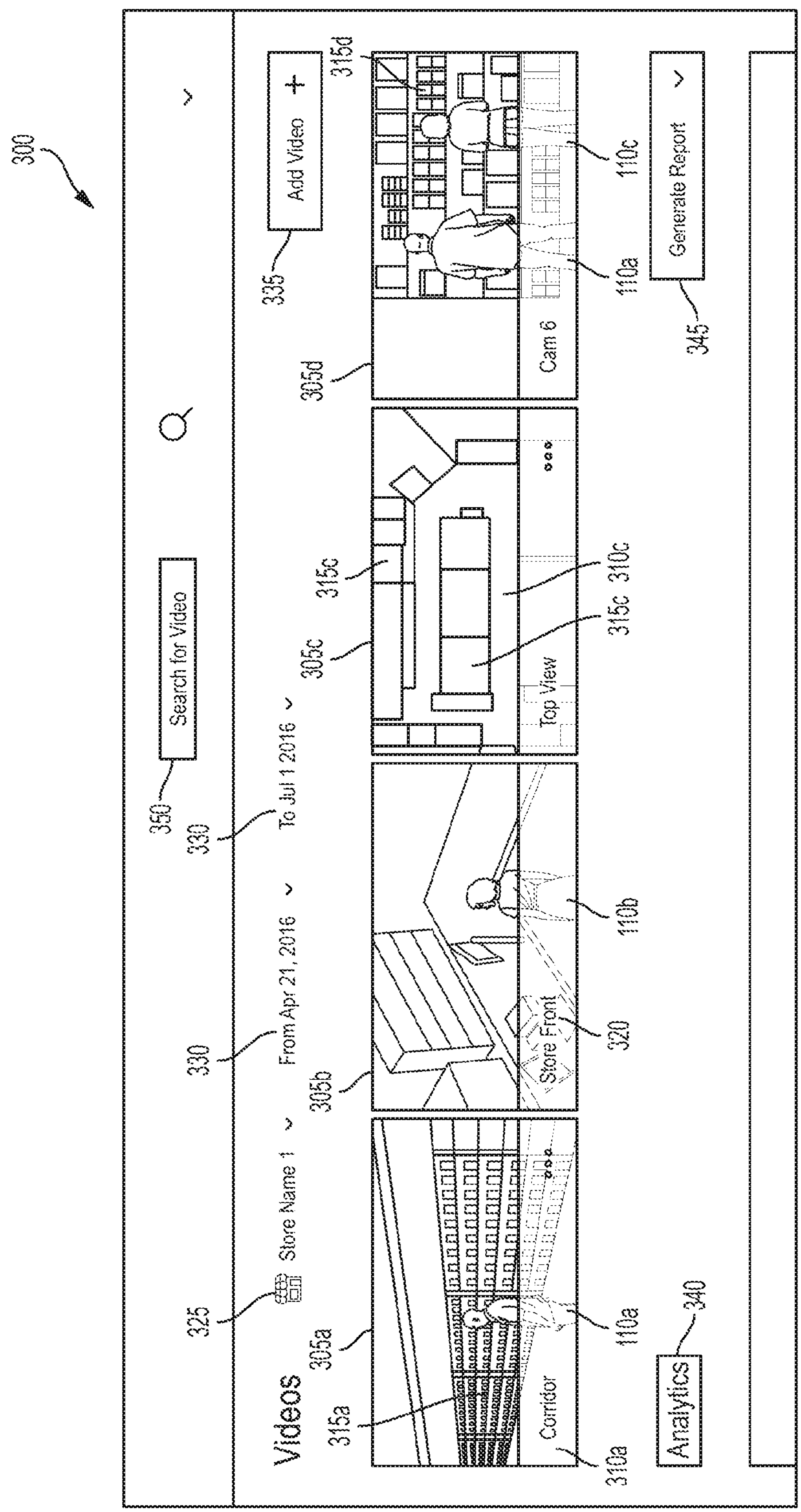
FIG. 3A is an example illustration of an image object detection display, according to an illustrative implementation.

FIG. 3A depicts an image object detection display 300. The display 300 can include an electronic document or rendering of a plurality of images 305*a-d* (that can be collectively referred to as images 305) created by one or more recording devices 105 and obtained by the data processing system 120. The data processing system 120 can provide the display 300, e.g., via the computer network 125, to the end user computing device 225 for rendering or display by the end user computing device 225. In some implementations, the data processing system 120 can also render the display 300.

The images 305 or any other images can be real time video streams, still images, digital photographs, recorded (non-real time) video, or a series of image frames. The images 305 can be taken from exactly one recording device or from more than one recording devices 105 that can each have a unique field of view that is not identical to a field of view of any other image 305. In the example of FIG. 3A, among others, the image 305*a* depicts is labelled as a "corridor" view and depicts a corridor 310*a* in a store, with an object 110*a* (e.g., a man wearing a short sleeve shirt) present in the corridor and a shelf 315*a* as a background object 110. The image 305*b* indicates a "store front" view and depicts a check out area of the store and includes an object 110*b* (e.g., a woman wearing a dress and short sleeve shirt) present near a checkout station 320. The image 305*c* depicts a top view of an area of the store with a corridor 310*c* and shelves 315*c*, and with no people or other transient objects 110. The image 305*d* depicts a "Cam 6" or perspective view of a recording device 105 in the store having the name "Cam 6" and including the object 110*a* (the man with the short sleeve shirt), object 110*c* (a woman wearing pants), and a shelf 315*d*. The display 300 can also include store data such as a store name indicator 325 or an image date range 330, for example from Apr. 21, 2016 to Jul. 1, 2016.

The display 300 can be rendered by the end user computing device 225 for display to an end user. The end user can interface with the display 300 to obtain additional information or to seek matches of objects within the images 300. For example, the display 300 can include an actuator mechanism or button such as an add video button 335, an analytics button 340, or a generate report button 345. These are examples and other buttons, links, or actuator mechanisms can be displayed. The add video button 335 when clicked by the user or otherwise actuated, can cause the end user computing device 225 to communicate with the data processing system 120 to communicate a request for an additional image not presently part of the display 300.

The analytics button 340, when actuated, can cause the end user computing device 225 to communicate with the data processing system 120 to request analytical data regarding object traffic, characteristics, or other data regarding objects 110 in the images 305. The generate report button 345, when actuated, can cause the end user computing device 225 to communicate with the data processing system 120 to request a report (e.g., an electronic document) associated with one or more of the images 305. The electronic document can indicate details about object traffic, correlations, characteristics, associations, present activity, predicted behavioral activity, predicted future locations, relations, group or family unit identifications, recommendations, or other data regarding objects 110 in the images 305. The display 300 can include a video search button 350 that, when actuated, provides a request for video search to the data processing system 120. The request for a video search can include a request to search images of the recording devices 105, e.g., for one or more objects 110 present in multiple different images recorded by different recording devices 105, or a request to search images from a larger collection of images, such as images available on the internet that may include one of the objects present in an image created by one of the recording devices 105. The data processing system 120 can receive the indications of actuation of these or other actuation mechanism of the display 300 and in response can provide the requested information via the computer network 125 to the end user computing device 225 for display by the end user computing device.

Figure 3B:
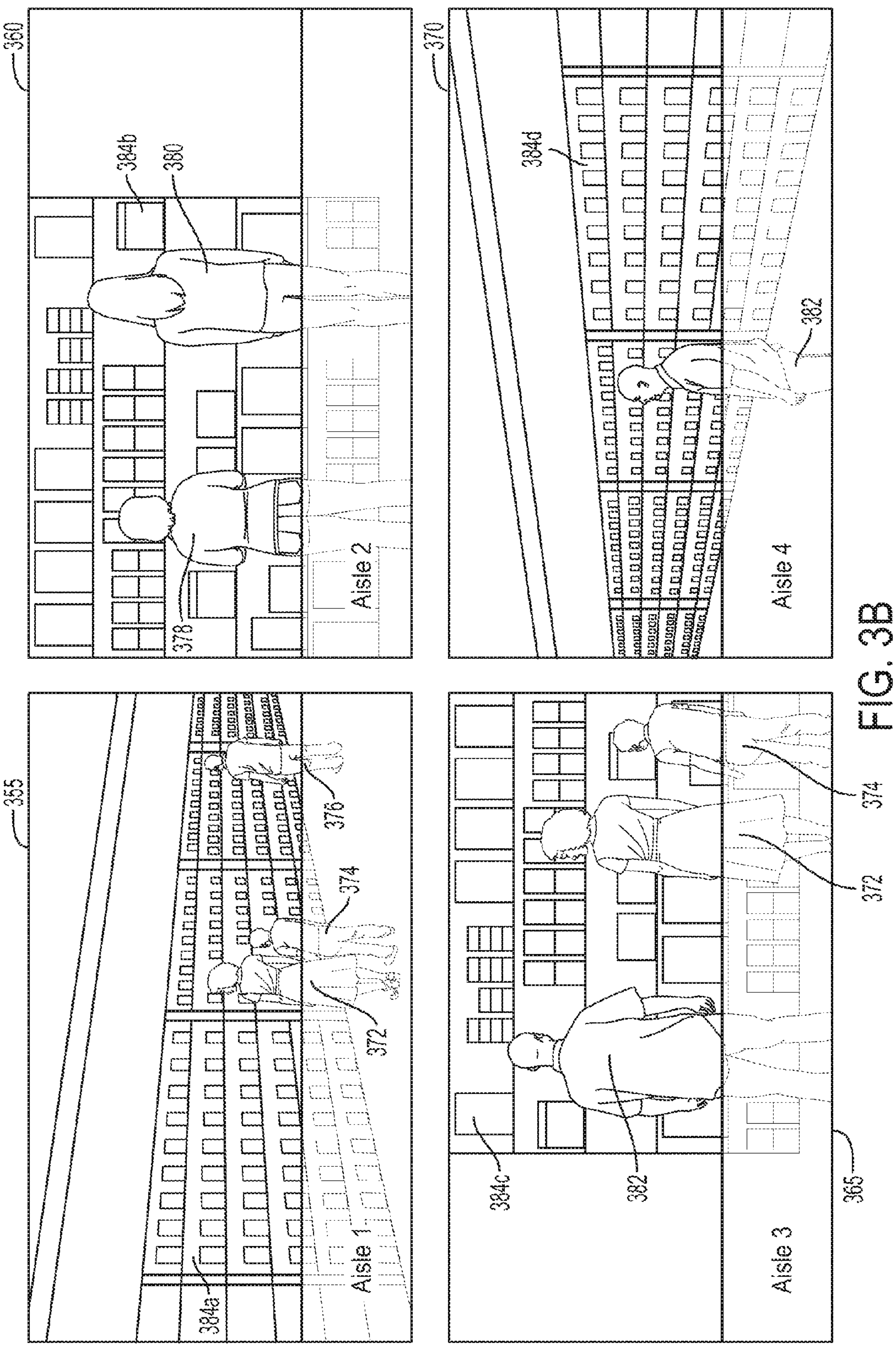
FIG. 3B is an example illustration of an image object detection display, according to an illustrative implementation.

FIG. 3B depicts an example image object detection display of a plurality of images, including a first image 355, a second image 360, a third image 365, and a fourth image 370. The images of FIG. 3B can be part of a display such as the display 300, and can be part of an electronic document or rendering created by one or more recording devices 105 and obtained by the data processing system 120, e.g., responsive to actuation of the analytics button 340 or the generate report button 345. Each of the first image 355, the second image 360, the third image 365, and the fourth image 370 can be created by the same or different recording device 105, e.g., in a store.

The data processing system 120 can determine characteristics of objects within images such as the images of FIG. 3B (or other images). For example, the object forecast component 218 can determine a characteristic of at least two objects. The object forecast component 218 can determine a characteristic of an object based at least on part on the correlation between two objects, or independent of any identified correlation between objects. The characteristic can indicate a predicted or determined behavioral trait of the object (e.g., the object 110). The characteristic can also indicate an association or relationship between objects.

The object forecast component 218 can determine characteristics by querying objects against a pre-trained network (such as a Convolutional Neural Network, or a Recurrent Neural network, or a Support Vector Machine (SVM) classifier. The neural or other pre-trained network or the SVM can be part of the data processing system 120 or a separate system in communication with the data processing system 120 via the computer network 125. The classifier or pre-trained network can be trained with classes of interest with exemplar imagery (e.g. "couple with small child", "father with child," "couple sitting on a bench", or "persons loitering") pertaining to objects and activities being monitored by the data processing system 120. The data processing system 120 (or components thereof such as the object classification component 210 or the object forecast component 218 can employ a combination of classifiers for more complex, dynamic, or multi-faceted activities.

For example, the object classification component 210 (or other component of the data processing system 120) can determine that the first image 355 includes three objects that are people, e.g., object 372, object 374, and object 376. In this example, the object 372 can have a first level classification category of "woman" and a second level classification category of "wearing a dress". The object 374 can have a first level classification category of "child" and a second level classification category of "wearing pants". The object 376 can have a first level classification category of "man" and a second level classification category of "wearing pants". These classification categories are examples, and classification categories can include information other than age, gender, and clothing, such as other physical characteristics related to height, weight, gate, clothing or hair color, accessories association with the object, or other characteristics.

Continuing with this example, the data processing system 120 (e.g., the object detection component 205) can determine that the object 372 (the woman wearing a dress) and the object 374 (the child) are in physical contact with each other, e.g., they are holding hands. This information can be part of a data structure added to the database 220, where it can be accessed by the object forecast component 218 to determine a characteristic between two objects, e.g., that the object 372 (the woman wearing a dress) and the object 374 (the child) are part of a family unit such as mother and child. In this example, the data processing system 120 can determine that the first object (object 372) and the second object (object 374) are different objects (e.g., different people, as determined by the object matching component 215) that have an association or relation with each other (e.g., they are determined to be part of the same family unit, or people who are travelling together or who otherwise know each other.) The object forecast component 218 or other data processing system 120 component can determine the family unit characteristic based on the classification component of the first object 372 and the second object 374 (e.g., adult woman and child), as well as other factors such as the determination that the first object 372 and the second object 374 are in physical contact with each other or are present together in more than one image (e.g., the first image 355 and the third image 365).

Referring to the first image 355, the object detection component 205 can detect the object 376, and the object classification component 210 can determine that the object 376 is a man wearing pants. For example, from the analysis of one or more than one image that includes at least one of the object 372, object 374, or object 376, the object forecast component 218 can determine that the object 376 is not part of the family unit that includes the object 372 (e.g., mother) and the object 374 (e.g., child). For example, object forecast component 218 can determine that the object 376 is or remains beyond a threshold distance (e.g., 10 feet) from the object 372 or the object 374 in one or more images. From this information the object forecast component 218 can determine the characteristic that the object 376 is not related or unknown to the object 372 and to the object 374. In this example the man (object 376) is not part of the family unit that includes the woman (object 372) and the child (object 374) in the first image 355.

With reference to FIG. 3B, among others, the first image 355 depicts three transient objects, e.g., people in an aisle (e.g., "Aisle 1") of a store. The data processing system 120 can analyze the first image 355 to determine that the first object 372 and the second object 374 are part of a family unit, and that the third object 376 is not part of the family unit, based for example on physical proximity, physical contact, distance, or other classification category information associated with the objects.

The second image 360 includes a field of view of "Aisle 2", e.g., a second aisle in the store associated with the first image 355. The second image 360 includes two transient objects, e.g., object 378 and object 380. The components of the data processing system 120 can detect these objects, determine one or more classification categories for these objects, determine whether or not these objects appeared (or a likelihood that they appeared) in a different image having a different field of view, and can determine a characteristic for either or both of these objects. The object forecast component 218 can determine a characteristic of the object 378. For example, the object 378 can be a woman who is middle aged, wearing pants, with a characteristic that the object 378 is not associated with any other objects as part of a family unit in any other images analyzed by the data processing system 120, or with a predicted behavioral characteristic that the object 378 present in Aisle 2 is likely to also visit a different aisle in the same store. (For example, from statistical analysis the data processing system 120 can determine that a middle aged woman who visits Aisle 2 is also likely to visit Aisle 4.)

The third image 365 includes a view of "Aisle 3", e.g., a third aisle in the store associated with the first image 355 and the second image 360. The third image 365 includes three transient objects, e.g., the object 372 (woman wearing dress), the object 374 (child), and another object 382 (e.g., a man who is bald and wearing pants). In this example, the object matching component 215 can determine that the same objects 372 and 374 in the first image 355 are also present in the third image 365. The object matching component 215 can also determine that the object 382 is not present in the first image 355. In some implementations the object forecast component 218 determines (or increases a likelihood that) the object 372 and the object 374 are a family unit based on their observed interaction or positioning with respect to one another in the first image 355 and the third image 365. For example, the object detection (or other) component 205 determines that the object 372 and the object 374 are holding hands in the first image 355, and the object classification component 210 classifies these objects as adult women and child—a classification compatible with a parent-child family unit. Further, the data processing system 120 determines that the same object 372 and object 374 are present in the third image 365. In the third image 365 the object 372 and the object 374 are not holding hands but are positioned generally proximate to each other (e.g., within 10 feet, or other threshold distance, of each other). From this information the object forecast component 218 can determine or increase a determined likelihood that the first object and the second object are part of a family unit.

The object forecast component 218 can also use the information from the third image 365 to increase a likelihood of a family unit conclusion already determined from a review of the first image 355, or other images that are not the third image 365. For example, from an analysis of the first image 355 (or other images) the object forecast component 218 can determine an 80% likelihood that the object 372 and the object 374 are part of a family unit. Then, from an analysis of the third image 365 where the object 372 and the object 374 are within a threshold distance (e.g., 10 feet or 20 feet) of each other, the object forecast component 218 can increase the likelihood of this family unit characteristic of these objects from 80% to 90%. This determination can be provided to the database 220 to update a DNN model that can be used to determine characteristics of these or other objects.

The object forecast component 218 can also determine at least one characteristic of the object 382, (e.g., the bald man) present in the third image 365. For example, based on the distance between the object 382 and the objects 372 and 374, the object forecast component 218 can determine that the object 382 is or is not part of the same family unit as the objects 372 and 374. For example, if the object 382 is within a threshold distance of the objects 372 or 374, this may indicate that all three objects are part of the same family unit. However, if the third image 365 is the only image in which these three objects are within a threshold distance of each other, this may indicate that these three objects are not all part of the same family unit. The object forecast component 218 can determine characteristics for these and other objects based on these and other factors.

The fourth image 370 includes a view of "Aisle 4", e.g., a fourth aisle in the store associated with the first image 355, the second image 360, and the third image 365. The fourth image 370 includes one transient objects, e.g., the object 382 (e.g., the man who is bald and wearing pants). In this example, the object matching component 215 can determine that the object 382 is the same person, present in the third image 365 and the fourth image 370. In addition to recognizing the object across different images, the data processing system 120 can use this information to train a DNN or other model. For example, the object forecast component 218 can determine that men present in the store alone, such as the object 382 that are present in Aisle 3 (as in the third image 365) are likely to also be present in Aisle 4, (as in the fourth image 370). This data can be used by the object forecast component 218 to predict behavioral activity of objects, e.g., by indicating that men similar to the object 382 that are present in Aisle 3 of a store are also likely to visit Aisle 4 of the store.

The characteristic determined by the object forecast component 218 can indicate predicted behavioral activity of at least one object. For example, the object forecast component 218 can also use past data, e.g., from a DNN or data model, to determine that an object such as the object 382 present in Aisle 3 in the third image 365 is a predicted likelihood of a certain value (e.g., 30%, 50%, or greater than 80%) to subsequently travel to Aisle 4 in the fourth image 370. The first image 355, second image 360, third image 365, and fourth image 370 can also include respective background objects such as respective shelves 384*a*, 384*b*, 384*c*, 384*d* or other stationary objects.

Figure 3C:
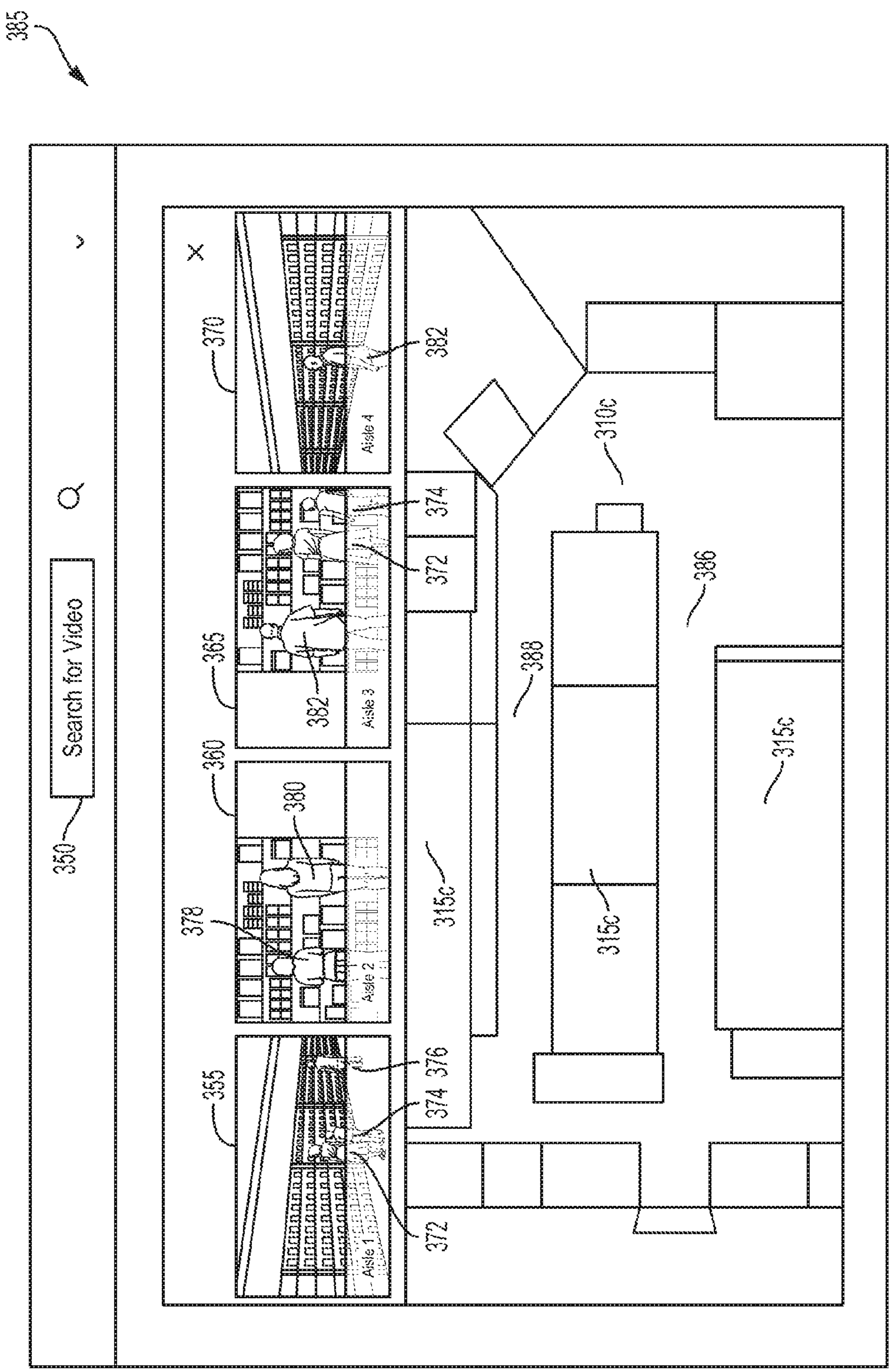
FIG. 3C is an example illustration of an image object detection display, according to an illustrative implementation

FIG. 3C depicts an image object detection display 385. The display 385 can be an electronic document rendered on the computing device 225, and can include images such as the first image 355, the second image 360, the third image 365, and the fourth image 370. The display 385 can also include a store layout (e.g. a live or static image), for example with the corridor 310*c* and shelves 315*c*. The corridor 310*c* can include aisles such as a first aisle 386 and a second aisle 388. The first aisle 386 or the second aisle 388 can include at least one object 110, such as one or more of object 372, object 374, object 376, object 378, object 380, or object 382 among others. The data processing system 120 can track movement of the objects in real time or historically, e.g., through the first aisle 386 or the second aisle 388 or can indicate other patterns of object behavior or predicted object behavior. The images in FIG. 3A, FIG. 3B and FIG. 3C, among others, can be the basis of or included in an electronic document report, generated for example responsive to actuation of the generate report button 345.

The data processing system 120 can obtain instructions, e.g., from the database 220 or from the end user computing device 225 to provide an indication to the end user computing device 225 upon the occurrence of a characteristic such as a defined event. For example, the end user computing device 225 can instruct the data processing system 120 to provide an alert (or indication that the characteristic is satisfied) when a person (object) goes from Aisle 1 (image 355) to Aisle 4 (image 370). In another example, the end user computing device 225 can provide the data processing system 120 with instructions to infer predicted future behavior or future location of an object based on an observed event. For example, the data processing system 120 can be instructed to determine a characteristic of an interest in diapers upon the identification of a parent/child of family unit of objects present in a convenience store.

Figure 4:
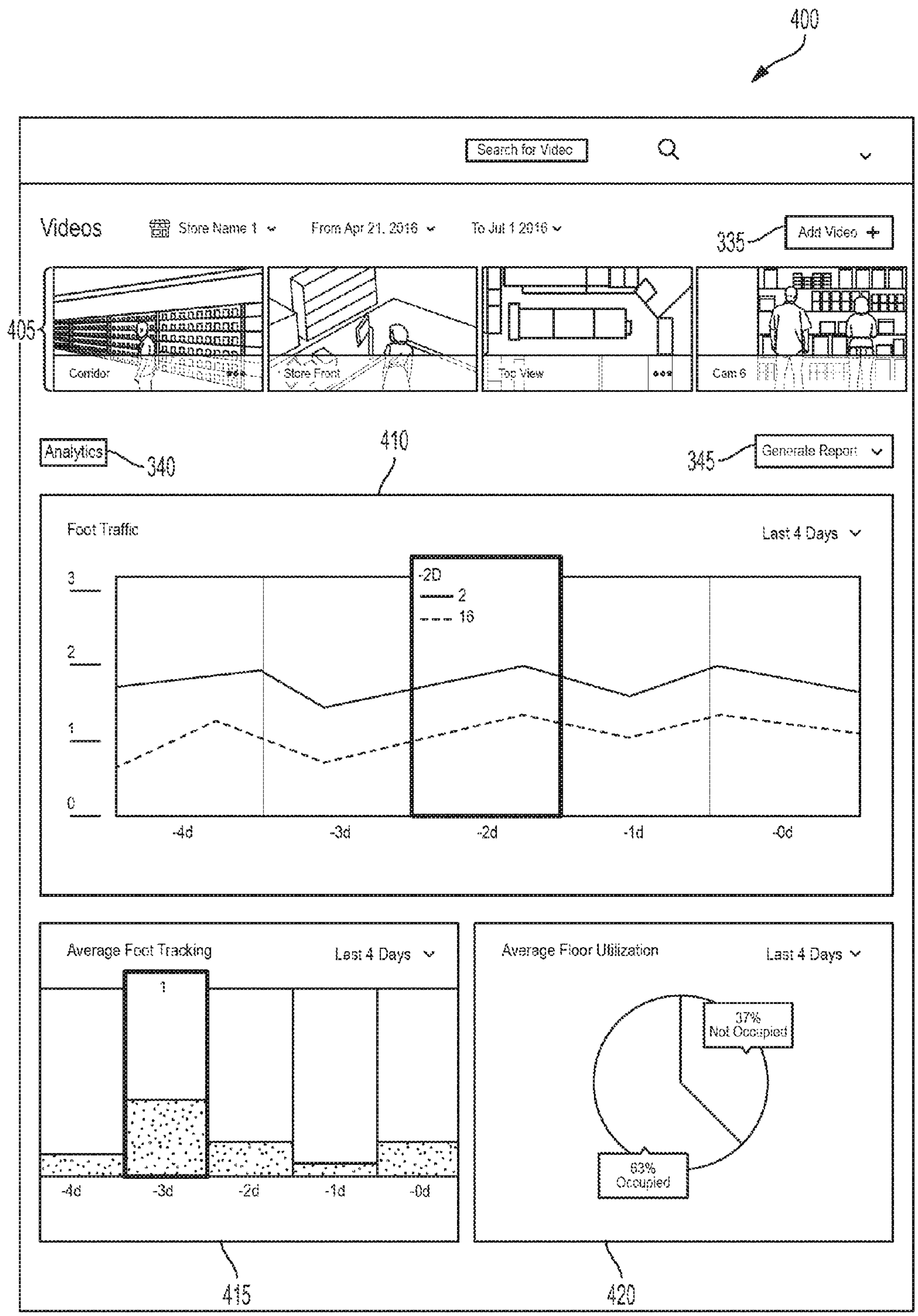
FIG. 4 is an example illustration of an image object detection display, according to an illustrative implementation.

FIG. 4 depicts an image object detection display 400. The display 400 can include an electronic document provided by the data processing system 120 to the end user computing device 225 for rendering by the end user computing device 225. The display 400 can include an image display area 405. The image display area 405 can include images obtained by the data processing system 120 from the recording devices 105. These can include the images 305 or other images; and can be real time, past, or historical images and the data processing system 120 can provide the images present in the image display area 405 to the end user computing device 225 for simultaneous display by the end user computing device within the display 400 or other electronic document.

The display 400 can include analytic data or report data. For example, the display 400 can include a foot traffic report 410, a foot tracking report 415, or a floor utilization chart 420. These are examples, and the display 400 can include other analyses of objects 110 present in the images 305 (or any other images) such as information about characteristics, associations, predicted behavioral activity, or predicted future location of at least on object 110. In some implementations, the end user can actuate the analytics button 340 or the generate report button 345. For example, the generate report button 345 (or the analytics button 340) can include a drop down menu from which the end user can select a foot traffic report 410, a foot tracking report 415, or a floor utilization chart 420, among others. The data processing system 120 can obtain this data, e.g., from the database 220 and create a report in the appropriate format.

For example, the foot traffic report 410 can indicate an average rate of foot traffic associated with two different images day-by-day for the last four days in a store associated with two recording devices 105, where one rate of foot traffic (e.g., associated with one image) is indicated by a solid line, and another rate of foot traffic (e.g., associated with another image) is indicated by a dashed line. An end user viewing the display 400 at the end user computing device 225 can highlight part of the foot traffic report 410. For example, the "−2d" period from two days ago can be selected (e.g., clicked) by the user. In response, the data processing system 120 can provide additional analytical data for display, such as in indication that a rate of foot traffic associated with one image is 2 objects per hour (or some other metric) for one image, and 1.5 objects per hour for another image.

The average foot traffic report 415 can indicate average foot traffic over a preceding time period (e.g., the last four days) and can provide a histogram or other display indicating a number of objects 110 (or a number of times a specific object 110 such as an individual person was) present in one or more images over the previous four days. The average floor utilization report 420 can include a chart that indicates utilization rates of, for example, areas within the images 305 (or other images) such as corridors. For example, the utilization report 420 can indicate that a corridor was occupied by one or more objects 110 (e.g., at least one person) 63% of the time, and not occupied 37% of the time. The data processing system 120 can obtain utilization or other information about the images from the database 220, create a pie chart of other display, and provide this information to the end user computing device 225 for display with the display 400 or with another display.

Figure 5:
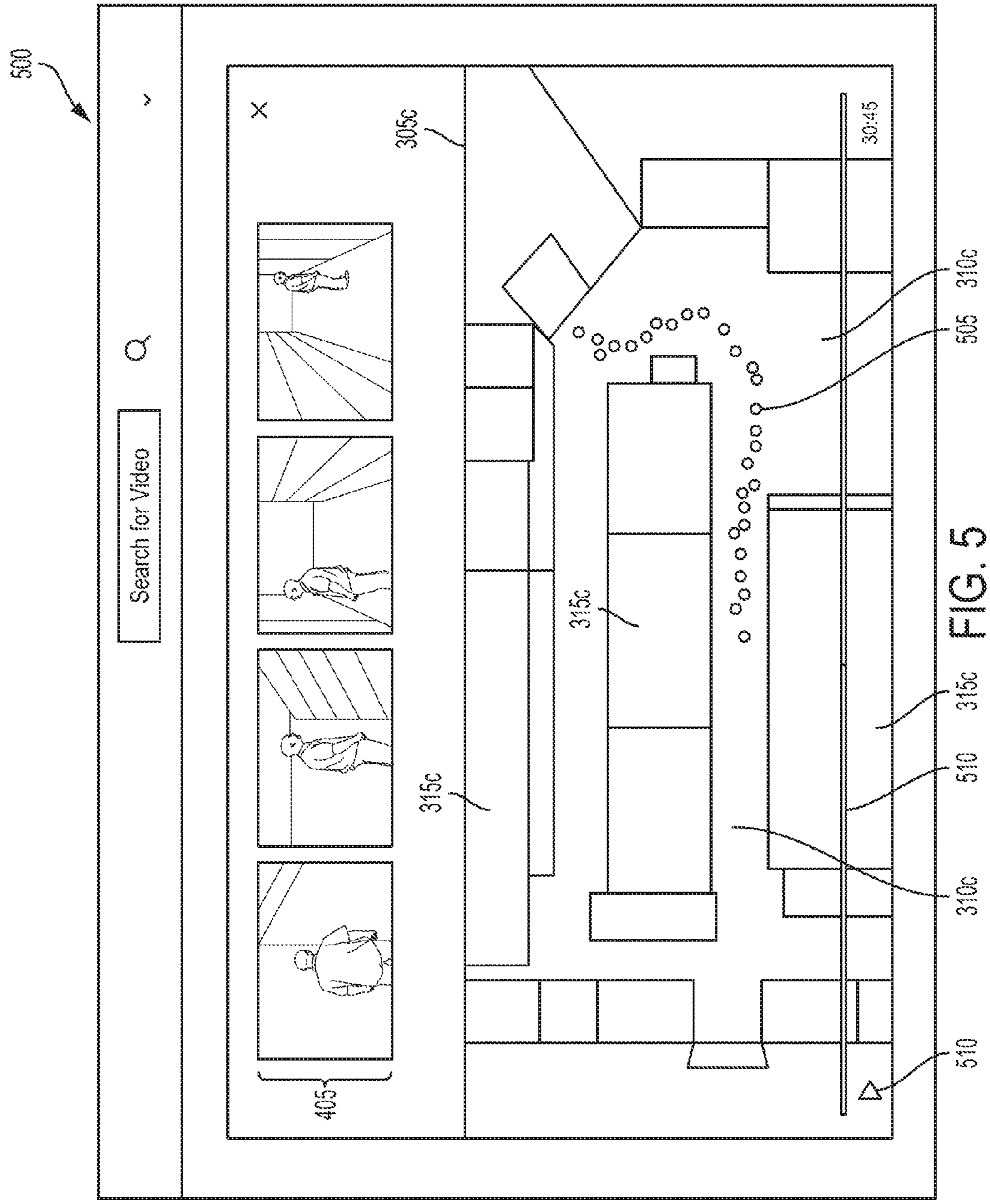
FIG. 5 is an example illustration of an image object detection display, according to an illustrative implementation.

FIG. 5 depicts an image object detection display 500. The display 500 can include the image display area 405 that displays multiple images. The display 500 can include an electronic document presented to an end user at the end user computing device 225 as a report or analytic data. The example display 500 includes the image 305*c* that depicts the corridor 310*c* and shelves 315*c*. The image 305*c* can include at least one track 505. The track 505 can include multiple instances of an image over time, and can include a digital overlay of the image 305*c* that indicates a path taken by, for example the man (object 110*a*) of image 305*a* or the woman (object 110*b*) of 305*b*, or another transient object 110 that passes into the field of view of the image 305*c*. The track can indicate the path taken by an object 110 (not shown in FIG. 5) in the corridor 310*c*. The data processing system 120 can analyze image data associated with the image 305*c* to identify where, within the image 305*c*, an object 110 was located at different points in time, and from this information can create the track that shows movement of the object 110.

The display 500 can include a timeline 510 that, when actuated, can run forward or backward in time to put the track 505 in motion. For example, clicking or otherwise actuating a play icon of the timeline 510 can cause additional dots of the track to appear as time progresses, representing motion of the object 110 through the corridor 310*c*. The track 505 can represent historical or past movement of the object 110 through the image 305*c*, or can represent real time or near real time (e.g., within the last five minutes) movement through the image 305*c* as well as other images with non-overlapping fields of view. The track can include an aggregate of the various appearances of an object 110 (e.g. human) over one or more recording devices 105, over a specified period of time. Once the data processing system 120 has identified the various appearances of the object 110 above a specified mathematical threshold, the data processing system 120 can order the various appearances chronologically to build a most likely track of the object 110.

The data processing system 120 can create one or more tracks 505 for one or more objects 110 present in one or more images or one or more fields of view. For example, the data processing system 120 can generate a track 505 of a first object 110 within the field of view of a first image (e.g., the image 305*c*) and can also generate a different track 505 of a second object 110 within the field of view of a second image (e.g., an image other than the image 305*c*). For example, the data processing system 120 can receive a query or request from the end user computing device 225 that identifies at least one object 110, (e.g., the object 110*a*—the man with the short sleeve shirt in the example of FIG. 3A). Responsive to the query, the data processing system 120 can generate a track of the object 110, e.g., track 505. The data processing system 120 can provide the track 505 (or other track) to the end user computing device 225 for display by the end user computing device 225.

The request to view the track 505 of the object 110 can be part of a request to generate an electronic document that includes images, analytics, or reporting data. For example, the data processing system 120 can receive a request to generate a document associated with at least one image 305 (or any other image) responsive to end user actuation of an interface displayed by the end user computing device 225. Responsive to the request, the data processing system 120 can generate the electronic document (e.g., displays 300, 385, 400, 500, or other displays). The electronic document can include one or more tracks 505 (or other tracks) of objects 110, one or more utilization rates associated with images (or with the fields of view of the images), or traffic indicators indicative of the presence or absence of objects 110 within the images. The data processing system 120 can provide the electronic document to the end user computing device 225, for example via the computer network 125.

The data processing system 120 can generate the tracks 505 using background subtraction, similarity measures, or search-retrieval methods, among others. Meta data information related to the tracks 505 such as time information, position or pose estimations, or other information can be provided to the end user computing device 225 for display with an electronic document. The track 505 can include a meta-track, e.g., a track that represents movement of a group of objects 110, e.g., a group of people such as a family unit or other group standing or walking together. The data processing system 120 can map or hash objects 110 (or any other object) to tracks 505 that indicate the location or persistence of an object within an image of one field of view 115. The data processing system 120 can map or hash the tracks 505 into meta-tracks that represent movement of more than one object 110, or multiple tracks of a single object 110. The meta-tracks can be derived from images of a single recording device 105, or from images of multiple recording devices 105 (e.g., over a time period of multiple hours or multiple days).

To generate or obtain the track 505 of an object 110 (e.g., an object designated as being of interest to track or meta-track), the data processing system 120 can use a k-nearest neighbor technique to identify objects images similar (or that may be the same as) the object of interest that is being tracked. To refine the track or identify additional object data, the data processing system 120 can perform a second-pass ordering against a Trie or tree data structure, a third-pass ordering against a Tanimoto or Jaccard similarity coefficient, or other multi-dimensional similarity metric, or a fourth-pass ordering using an n-gram search of a text representation of the descriptor. The additional ordering levels can refine results such as likelihoods of matches or correlations of objects 110 present in multiple different images.

The displays 300, 385, 400, or 500 or other images can be displayed e.g., by the end user computing device within a web browser as a web page, as an app, or as another electronic document that is not a web page. The information and ranges shown in these displays are examples and other displays and other data can be displayed. For example, a user can select a time period of other than a previous four days from a drop down menu.

Figure 6:
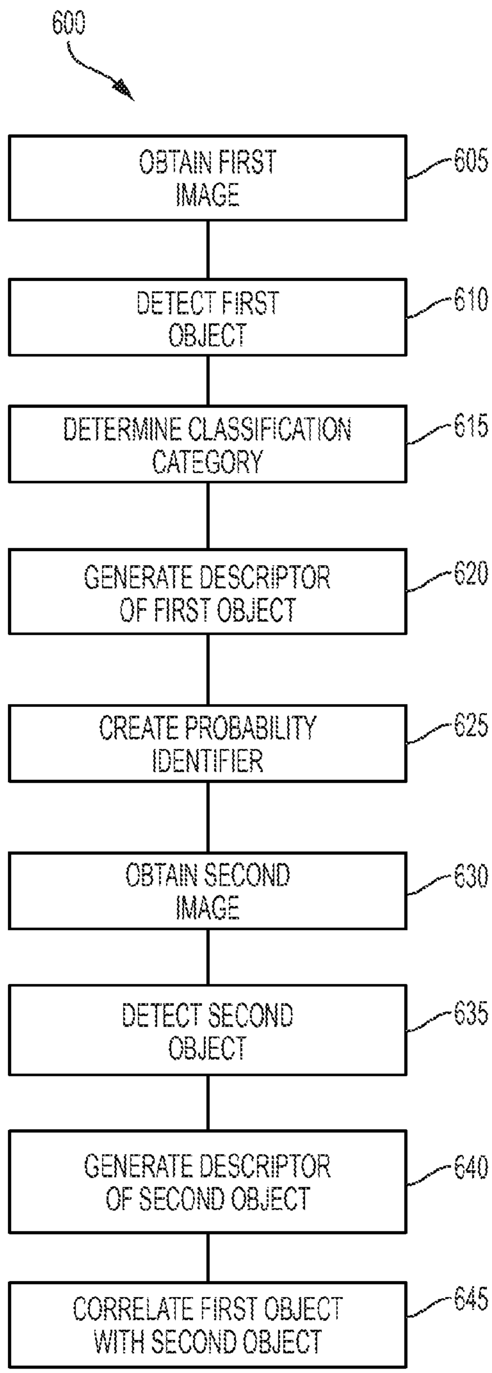
FIG. 6 is a flow diagram depicting an example method of digital image object detection, according to an illustrative implementation.

FIG. 6 depicts an example method 600 of digital image object detection. The method 600 can obtain a first image (ACT 605). For example, the data processing system 120 can receive or otherwise obtain the first image from a first recording device 105. The first image can be obtained (ACT 605) from the first recording device 105 via the computer network 125, direct connection, a portable memory unit. The first image can be obtained (ACT 605) in real time or at symmetric or asymmetric periodic intervals (e.g., daily or every six or other number of hours). The first image can represent or be an image of the field of view of the first recording device. The data processing system 120 that receives the first image can include at least one object detection component 205, at least one object classification component 210, or at least one object matching component 215.

The method 600 can detect a first object 110 present within the first image and within the field of view of the first recording device 105 (ACT 610). For example, the object detection component 205 can implement an object tracking technique to identify the first object 110 present within multiple frames or images of the first image (ACT 610). The first object 110 can include a transient object such as a person or vehicle, for example. The method 600 can also determine at least one classification category for the object 110 (ACT 615). For example, when the object 110 is a transient object, the object classification component 210 can determine a first level classification category for the object (ACT 615) as a "person" and a second level classification category for the object as a "male" or "male wearing a hat". In some implementations, the second level classification can indicate "male" and a third level classification can indicate "wearing a hat". The second and higher order classification category levels can indicate further details regarding characteristics of the object 110 indicated by a lower order classification category level.

The method 600 can generate a descriptor of a first object 110 (ACT 620). For example, the object classification component 210 can create a probability identifier (ACT 615) that indicates a probability that the descriptor is accurate. The probability identifier (and the descriptor and classification categories) for a first or any other object 110 can be represented as data structures stored in the database 220 or other hardware memory units such as a memory unit of the end user computing device 225. For example, the data processing system 120 can assign the first object 110 to a first level category of "male person" (ACT 615). This information can be indicated by the descriptor for the first object 110 that the data processing system 120 generates (ACT 620). The descriptor can be stored as a data structure in the database 220. Based for example on analysis of the image obtained from a first recording device 105, the data processing system 120 can determine or create a probability identifier indicating a 65% probability or likelihood that the first object 110 is in fact a male person (ACT 625). The probability identifier associated with the descriptor of the first object 110 can also be represented by a data structure stored in the database 220.

The method 600 can obtain a second image (ACT 630). For example the data processing system 120 or component thereof such as the object detection component 205 can receive a second image from a second recording device 105 (ACT 630) that can be a different device than the first recording device 105 that generated the first image. The second image can be associated with a different field of view than the first image, such as a different store, a different portion of a same store, or a different angle or perspective of the first image. The same objects 110, different objects 110, or combinations thereof can be present in the two images. The data processing system 120 can obtain any number of second images (e.g., third images, fourth images, etc.) of different fields of view, from different recording devices 105. The second image can be obtained (ACT 630) from the recording device 105 via the computer network 125, manually, or via direct connection between the data processing system 120 and the recording device 105 that generates the second image.

The method 600 can detect at least one second object 110 within the second image (ACT 635). For example, the object detection component 205 can implement an object tracking technique to identify the second object 110 present within multiple frames or images of the second image (ACT 635). The second object 110 can be detected (ACT 635) in the same manner in which the data processing system 120 detects the first object 110 (ACT 610).

The method 600 can generate at least one descriptor for the second object 110 (ACT 640). For example, the data processing system 120 (or component such as the object classification module 210) can create a descriptor for the second object 110 (ACT 640) detected in the second image. The descriptor for the second object 100 can indicate a type of the object 110, such as a "person" or "vehicle". The data processing system 120 can also classify or assign the second image into one or more classification categories, and the descriptor can indicate the classification categories of the second image, e.g., "man with green jacket" or "vehicle, compact car". The descriptor for the second image can also be associated with a probability identifier that indicates a likelihood of the accuracy of the descriptor, such as a 35% probability that the second object 110 is a man with a green jacket. The descriptor (as well as the classification categories or probability identifier) can be provided to or read from the database 220, e.g., by the data processing system 120 or another device such as the end user computing device 225.

The method 600 can correlate the first object 110 with the second object 110 (ACT 645). The correlation can indicate the object and the second object are a same object. For example, the first and second object 110 can be the same man with a green jacket who passes through the field of view of the first recording device 105 (and is present in the first image) and the field of view of the second recording device 105 (and is present in the second image). For example, to correlate the first object 110 with the second object 110 (ACT 645), the object matching module 215 can compare or match the descriptor of the first object with the descriptor of the second object. The object matching module 215 can also consider the probability identifier for the descriptor of the first object (or the probability identifier for the descriptor of the second object) to determine that the first and second objects 110 are a same object, such as a particular individual. For example, the data processing system 120 can correlate the objects 110 (ACT 645) when the respective descriptors match and at least one probability identifier is above a threshold value, such as 33%, 50%, 75%, or 90% (or any other value).

Figure 7:
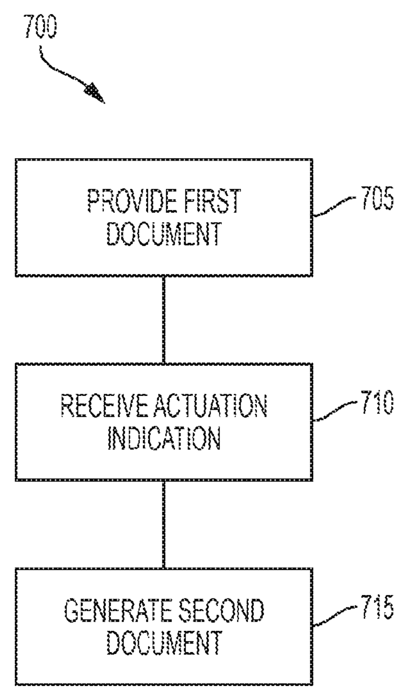
FIG. 7 is a flow diagram depicting an example method of digital image object detection, according to an illustrative implementation.

FIG. 7 depicts an example method 700 of digital image object detection. The method 700 can provide a first document (ACT 705). For example, the data processing system 120 can provide the first document, (e.g., an electronic or online document) (ACT 705) via the computer network 125 to the end user computing device 225 for display by the end user computing device 225. The first document can include displays, screenshots, stills, live, real time, or recorded video, or other representations of the images created by the recording devices 105. The first document can include at least one button or other actuator mechanism.

The method 700 can receive an indication that the actuation mechanism has been activated (ACT 710). For example, and end user at the end user computing device 225 can click or otherwise actuate the actuation mechanism displayed with the first document to cause the end user computing device 225 to transmit the indication of the actuation to the data processing system 120 via the computer network 125. The actuation of the actuation mechanism can indicate a request for a report related to the displayed images or other images by the data processing system 120 from the recording devices 105.

The method 700 can generate a second document (ACT 715). For example, responsive to a request for a report, such as the actuation of the actuation mechanism, the data processing system 120 can generate a second document (ACT 715). The second document, e.g., an electronic or online document, can include analytical data, charts, graphs, characteristics, associations, predicted behavioral activity, predicted future location, or tracks related to the objects 110 present in at least one of the images. For example, the second document can include at least one track of at least one object 110 present in one or more images, utilization rates associated with fields of view of the images, traffic indicators associated with the fields of view of the images. The data processing system 120 can provide the second document via the computer network 125 to the end user computing device 225 for rendering at a display of the end user computing device 225.

Figure 8:
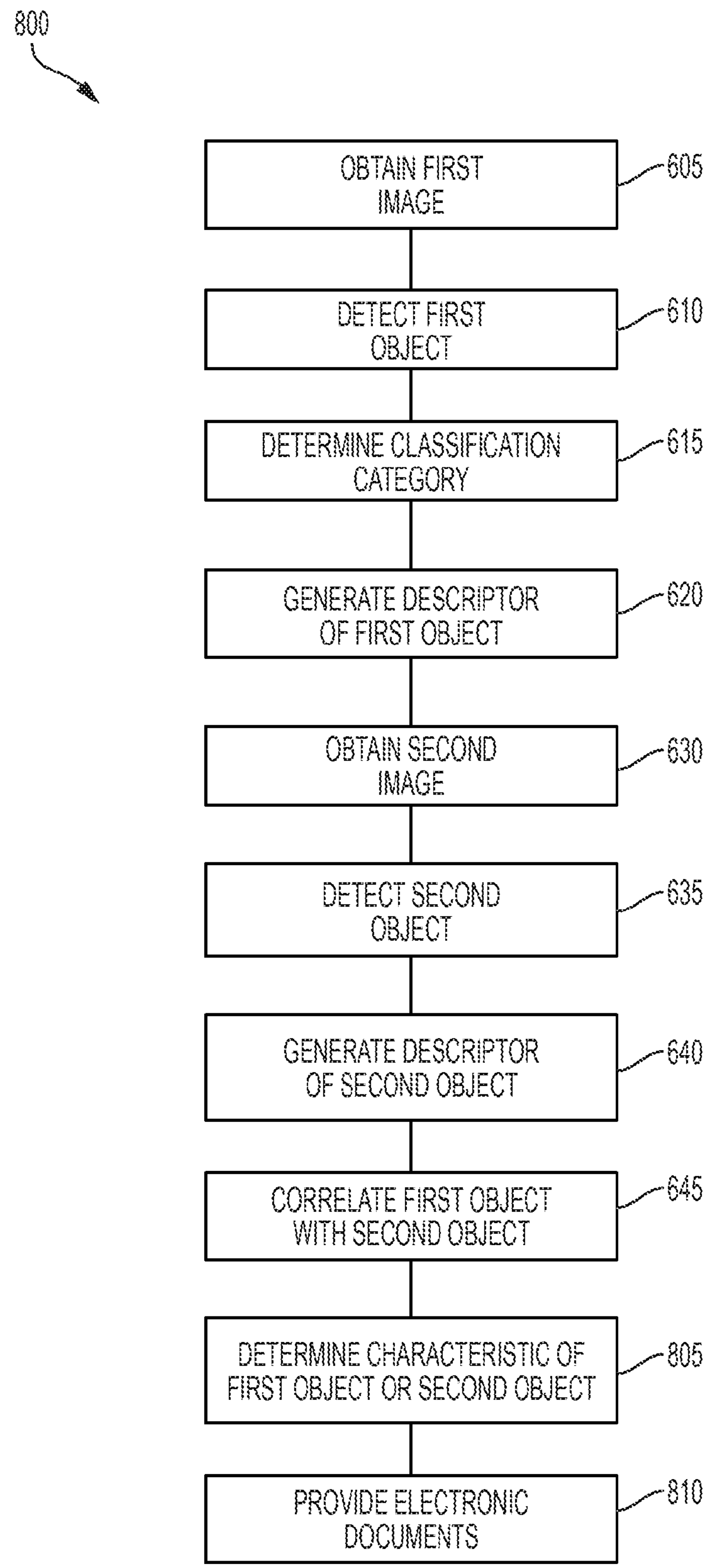
FIG. 8 is a flow diagram depicting an example method of digital image object detection, according to an illustrative implementation.

FIG. 8 depicts an example method 800 of digital image object detection. Referring to FIG. 6 and FIG. 8, among others, the method 800 can obtain a first image (ACT 605), detect a first object 110 present within the first image and within the field of view of the first recording device 105 (ACT 610), determine at least one classification category for the object 110 (ACT 615), and generate a descriptor of a first object 110 (ACT 620). The descriptor can include or be associated with a probability identifier that indicates probability or likelihood that the object is as described by the descriptor. The method 800 can also obtain a second image (ACT 630), detect at least one second object 110 within the second image (ACT 635), generate at least one descriptor for the second object 110 (ACT 640), and correlate the first object 110 with the second object 110 (ACT 645).

The method 800 can determine at least one characteristic of at least one object (ACT 805). For example, the object forecast component 218 can determine a characteristic of a first object in a first image or of a second object in a second image. The first object and the second object can be the same object (e.g., a same person such as the object 382 present in the image 365 and in the image 370). The data processing system 120 can also determine at least one characteristic (ACT 805) of different objects. For example, the object forecast component 210 can determine that the object 372 (woman) and the object 374 (child) have the characteristic of being a family unit or having another association indicating that the object 372 and the object 374 know each other (even if not related). The act to determine a characteristic (ACT 805) of at least one object can include determining that two different objects have an association with one another, e.g., they are related, know each other, or are travelling together.

The determined characteristic (ACT 805) can indicate predicted behavioral activity of the objects. For example, the object forecast component 218 can determine that two different objects (e.g., a parent and a baby) that are present in an image of a store that includes a diaper aisle are also likely to enter a different aisle of the store that includes baby food. The determined characteristic (ACT 805) can also indicate predicted future location of at least one object. For example, the object forecast component 218 can access a DNN or data model to determine that 60% (or other percentage) of objects classified as teenage males present in an aisle of an electronics store that includes stereo systems will also pass through a different aisle of the electronics store (a different location) that includes video games. In this example, the object forecast component can assign, designate, or associate a particular object 110 (an individual teenage male) in the stereo systems aisle with a characteristic, e.g., a 60% probability that the same individual teenage male will subsequently pass through the video game aisle.

The method 800 can provide at least one electronic document (ACT 810). For example, responsive to a request for a report, the data processing system 120 can generate an electronic document (ACT 810) that can include analytical data, charts, graphs, characteristics, associations, predicted behavioral activity, predicted future location, or tracks related to the objects present in at least one of the images. The electronic document can be provided from the data processing system 120 to the end user computing device 225 via the computer network 125, for display by the end user computing device 225.

Figure 9:
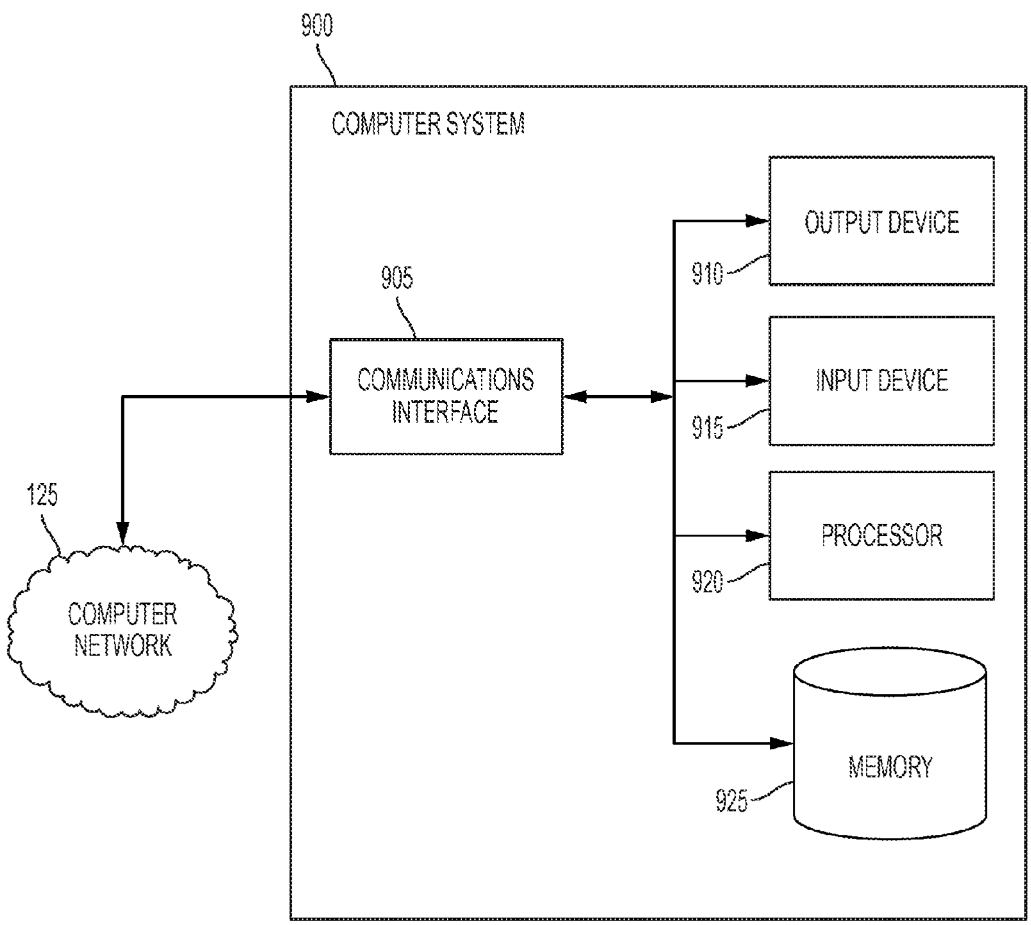
FIG. 9 is a block diagram illustrating a general architecture for a computer system that may be employed to implement elements of the systems and methods described and illustrated herein, according to an illustrative implementation.

FIG. 9 shows the general architecture of an illustrative computer system 900 that may be employed to implement any of the computer systems discussed herein (including the system 100 and its components such as the data processing system 120, the object detection component 205, object classification component 210, object matching component 215, or object forecast component 218 in accordance with some implementations. The computer system 900 can be used to provide information via the computer network 125, for example to detect objects 110, determine classification categories of the objects 110, generate descriptors of the objects 110, probability identifiers of the descriptors, correlations between or characteristics of objects 110, or to provide documents indicating this information to the end user computing device 225 for display by the end user computing device 225.

The computer system 900 can include one or more processors 920 communicatively coupled to at least one memory 925, one or more communications interfaces 905, one or more output devices 910 (e.g., one or more display devices) or one or more input devices 915. The processors 920 can be included in the data processing system 120 or the other components of the system 100 such as the object detection component 205, object classification component 210, or object matching component 215.

The memory 925 can include computer-readable storage media, and can store computer instructions such as processor-executable instructions for implementing the operations described herein. The data processing system 120, object detection component 205, object classification component 210, object matching component 215, recording device 105, or end user computing device 225 can include the memory 925 to store images, classification categories, descriptors, probability identifiers, or characteristics, or to create or provide documents, for example. The at least one processor 920 can execute instructions stored in the memory 925 and can read from or write to the memory information processed and or generated pursuant to execution of the instructions.

The processors 920 can be communicatively coupled to or control the at least one communications interface 905 to transmit or receive information pursuant to execution of instructions. For example, the communications interface 905 can be coupled to a wired or wireless network (e.g., the computer network 125), bus, or other communication means and can allow the computer system 900 to transmit information to or receive information from other devices (e.g., other computer systems such as data processing system 120, recording devices 105, or end user computing devices 225). One or more communications interfaces 905 can facilitate information flow between the components of the system 100. In some implementations, the communications interface 905 can (e.g., via hardware components or software components) provide a website or browser interface as an access portal or platform to at least some aspects of the computer system 900 or system 100. Examples of communications interfaces 905 include user interfaces.

The output devices 910 can allow information to be viewed or perceived in connection with execution of the instructions. The input devices 915 can allow a user to make manual adjustments, make selections, enter data or other information e.g., a request for an electronic document or image, or interact in any of a variety of manners with the processor 920 during execution of the instructions.

A technical problem solved by the systems and methods described herein relates to how to recognize object activity, interactions, and relationships of multiple objects in one or more video or still images. The data processing system 120 can detect objects (e.g., objects 110) in images (e.g., image 115) and interactions between objects. The object forecast component 218 and can make inferences, predictions, or estimations about object behavior based on detected object locations, descriptors, or interactions. For example, it may be difficult from a technological standpoint to determine interactions between objects that are present in multiple images across multiple fields of view. For example if an object such as a person is holding an item or other object, it can be difficult to determine if the person is actively using or related to the item, or merely touching it without any discernible interest.

At least one technical solution relates to cross-camera or multi image tracking whereby an object 110 such as a person appears in a first image, e.g., obtained from a recording device 105. The data processing system 120 can extract descriptors for the object, for example using a locality sensitive hashing (LSH) technique or an inverted index central data structure in conjunction with deep neural networks (such as Convolutional or Recurrent neural networks). The data processing system 120 can employ a combination of approaches (e.g., using multiple or different neural networks) to obtain more fine grained or accurate characteristics for objects. The LSH approach reduces the number of random variables under consideration (e.g., reduces the dimensionality of the data set). This improves and quickens the data analysis operations and the operation of servers or other computers that include the data processing system 120 by hashing input data (e.g., classification categories, descriptors, or detected object data) to a reduced number of buckets or verticals with sufficiently high probability. The operation of servers including the data processing system 120 is improved, as the reduced number of buckets results in faster identification of matches or correlations between the objects 110, for example.

Nonlinear dimensionality reduction as part of the feature extraction process relating to the objects 110 saves processing power and results in faster analysis by the data processing system 120 (e.g., detection, classification, matching or characteristic forecasting) relative to linear data transformation techniques (e.g., principal component analysis) for the objects present in images by transforming the data obtained from the images from high dimensional to low dimensional space. This allows for faster processing by the data processing system 120 of large data sets including thousands or hundreds of thousands of images, relative to linear data transformation based analysis.

The descriptors for objects (as determined by the object classification component 210) can be hashed to buckets and stored as data structures in the database 220. The objects 110 (e.g., blobs) corresponding to the descriptors can be compared to a convolutional neural network (CNN) or other recurrent neural network stored in the database 220 or other local or remote databases to identify features of objects represented by classification categories, such as age, gender, clothing, accessories (e.g., a backpack), a hat, or an association with an object and an item such as a shopping cart. The results of the DNN or CNN comparison can be stored in an inverted index data structure. At this point the object 110 has been classified (e.g., a man wearing a hat) and the classification data stored in an inverted index for subsequent retrieval when the data processing system 120 matches objects across multiple images from one or more different known or unknown sources by identifying the same object in different images, or by identifying other relationships, associations, or characteristics about the objects.

With data for an object 110 from one image 115 classified and stored, the data processing system 120 can repeat these operations for all images accessible by the data processing system 120, such as all images from security cameras in a store, or all analyzed images from an internet image search. If there is a match between classification categories, the data processing system 120 can determine that an object present in multiple images having different fields of view is, or is likely to be, a same person. For example, the data processing system 120 can perform a probabilistic estimate such as a vector similarity estimation (such as Cosine Similarity) on all descriptors or features of objects (e.g., as vectors) in different images to determine that they are the same object.

The DNN can include data models that are updated with new information provided by the data processing system 120. For example, a series of recording devices 105 in a store can capture a number of images of different fields of view. The data processing system 120 can determine from objects in these images that, for example, 80% of family units go to an aisle in the store that includes diapers, or that 90% of single person objects, not part of a family unit, do not visit the diaper aisle. This data can be provided to the DNN or other machine learning model to refine the model. The data processing system 120 can also determine patterns of behavior. For example, that the majority of objects present in aisle 1 of a store also go to aisle 2, and then to aisle 7.

The systems and methods described herein are not limited to a security or surveillance camera environment where the recording devices 105 are located in identified geographic locations (e.g., within a store). For example, the data processing system 120 can evaluate still or video images obtained from the internet to identify patterns. The recording devices 105 in this example can be unknown, or located in unidentified geographic locations. For example, the data processing system 120 can analyze images from various sources obtained over the internet to determine common characteristics among people (objects) holding a particular brand of drink, or wearing a hat for a particular sports team. For example, the data processing system 120 can determine that the majority or plurality of people holding a beverage of a particular brand are located on the beach, or on a ski slope, or are holding the beverage at a particular time, such as between 11:00 am and 1:00 pm.

The data processing system 120 can match objects responsive to a search query that has a visual query input.

For example, the end user computing device 225 can provide a visual search that includes a picture of an individual (or non-person such as a picture of a beverage container). The source of this image may be an unidentified recording device 105 in an unidentified geographic location (e.g., rather than a recording device 105 with a known location such as a security camera in a store) The data processing system 120 can scan other images (e.g., internet images or closed system images obtained from surveillance recording device 105) to determine a match or correlation with the individual (or other object) present in the visual query input. The visual query input can include images, cropped images, videos, or still or motion images that indicate or highlight a particular object that is the subject of the search query. The data processing system 120 (e.g., the object classification component 210) can determine descriptors or classification categories for an object of interest in the visual query input, and using these descriptors can identify the same object of interest in other images. For example, queries of the visual query input can be compared with descriptors based index representations (e.g., descriptors) of other images to identify at least on image that includes the same object present in the visual search query. For example, the data processing system 120 can convert the visual query input into multiple feature vector descriptors and can compare these descriptors with those from other images stored in the index. Identified matches can be retrieved, merged, and provided to the end user computing device 225 for display, responsive to the visual query input. This display can include one or more tracks 505 or metatracks.

The subject matter and the operations described herein can be implemented in digital electronic circuitry, or in computer software, firmware, or hardware, including the disclosed structures and their structural equivalents, or in combinations of one or more of them. The subject matter described herein can be implemented at least in part as one or more computer programs, e.g., computer program instructions encoded on computer storage medium for execution by, or to control the operation of, the data processing system 120, recording devices 105, or end user computing devices 225, for example. The program instructions can be encoded on an artificially-generated propagated signal, e.g., a machine-generated electrical, optical, or electromagnetic signal that is generated to encode information (e.g., the image, objects 110, descriptors or probability identifiers of the descriptors) for transmission to suitable receiver apparatus for execution by a data processing system or apparatus (e.g., the data processing system 120 or end user computing device 225). A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described herein can be implemented as operations performed by a data processing apparatus (e.g., the data processing system 120 or end user computing device 225) on data stored on one or more computer-readable storage devices or received from other sources (e.g., the image received from the recording devices 105 or instructions received from the end user computing device 225).

The terms "data processing system" "computing device" "appliance" "mechanism" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The data processing system 120 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more components, sub-programs, or portions of code that may be collectively referred to as a file). A computer program can be deployed to be executed on one computer or on multiple computers that are located at one site or distributed across multiple sites and interconnected by a communication network.

The processes and logic flows described herein can be performed by one or more programmable processors executing one or more computer programs (e.g., components of the data processing system 120) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented, e.g., by the data processing system 120, in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the internet), and peer-to-peer networks (e.g., ad hoc peer-to-peer networks).

The computing system such as system 100 or system 900 can include clients and servers. A client and server are generally remote from each other and typically interact through a communication network (e.g., the computer network 125). The relationship of client and server arises by virtue of computer programs running on the respective computers and having a client-server relationship to each other. In some implementations, a server transmits data (e.g., an electronic document, image, report, classification category, descriptor, or probability identifier) to a client device (e.g., to the end user computing device 225 to display data or receive user input from a user interacting with the client device). Data generated at the client device (e.g., a result of the user interaction) can be received from the client device at the server (e.g., received by the data processing system 120 from the end user computing device 225).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware, combination hardware-software, or software product. For example, the data processing system 120, object detection component 205, object classification component 210, object matching component 215, or object forecast component 218 can be a single component, device, or a logic device having one or more processing circuits, or part of one or more servers of the system 100.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems, devices, or methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. For example, references to the data processing system 120 can include references to multiple physical computing devices (e.g., servers) that collectively operate to form the data processing system 120. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of object detection across disparate fields of view, comprising:

a data processing system having an object detection component, an object classification component, an object forecast component, and an object matching component, the data processing system obtains a first image generated by a first recording device, the first recording device having a first field of view;

the object detection component of the data processing system detects, from the first image, a first object present within the first field of view;

the object classification component of the data processing system determines a first level classification category of the first object and determines a second level classification category of the first object;

the data processing system generates a descriptor of the first object based on at least one of the first level classification category of the first object and the second level classification category of the first object;

the data processing system obtains a second image generated by a second recording device, the second recording device having a second field of view different than the first field of view;

the object detection component of the data processing system detects, from the second image, a second object present within the second field of view;

the data processing system generates a descriptor of the second object based on at least one of a first level classification category of the second object and a second level classification category of the second object;

the object matching component of the data processing system identifies a correlation of the first object with the second object based on the descriptor of the first object and the descriptor of the second object; and the object forecast component of the data processing system determines a characteristic of at least one of the first object and the second object based at least in part on the correlation of the first object with the second object.

2. The system of claim 1, comprising:

the data processing system configured to determine the characteristic, the characteristic indicating that the first object and the second object are different objects that have an association with each other.

3. The system of claim 1, wherein the first image includes a third object and a fourth object, comprising:

the object matching component of the data processing system configured to identify an association between the first object, the third object, and the fourth object.

4. The system of claim 1, wherein the first image includes a third object, comprising:

the data processing system configured to generate a descriptor of the third object based on at least one of a first level classification category of the third object and a second level classification category of the third object; and the object matching component of the data processing system configured to identify an association between the first object and the third object based on the descriptor of the first object and the descriptor of the third object.

5. The system of claim 1, comprising:

the object matching component configured to determine a likelihood that the first object and the second object are a same object.

6. The system of claim 5, wherein the first image includes a third object and, wherein the first object and the second object are a same object comprising:

the object matching component of the data processing system configured to determine that the same object and the third object are at least part of a family unit.

7. The system of claim 6, wherein the characteristic indicates predicted behavioral activity of at least one of the same object and the third object.

8. The system of claim 1, wherein the characteristic indicates predicted behavioral activity of at least part of a family unit.

9. The system of claim 1, wherein the characteristic indicates a predicted future location of at least one of the first object and the second object.

10. The system of claim 1, comprising:

the object forecast component configured to identify the characteristic, the characteristic indicating that the first object and the second object are different but related objects.

11. The system of claim 1, comprising:

the first recording device and the second recording device each located in a respective identified geographic location.

12. The system of claim 1, comprising:

the first recording device and the second recording device located in a respective unidentified geographic location.

13. The system of claim 1, wherein the first image and the second image are obtained from the internet.

14. The system of claim 1, wherein the characteristic of at least one of the first object and the second object includes a predictive characteristic.

15. The system of claim 1, wherein the first object and the second object are a same object present in both the first image and the second image.

16. The system of claim 1, wherein the first object and the second object are different objects.

17. The system of claim 1, comprising:

the data processing system operational to create, for the first object, a data structure indicating a probability identifier for the descriptor of the first object, and to create, for the second object, a data structure indicating a probability identifier for the descriptor of the second object; and the object matching component operational to identify the correlation of the first object with the second object based on the probability identifier for the descriptor of the first object and the probability identifier for the descriptor of the second object.

18. The system of claim 1, comprising:

the data processing system configured to provide, to an end user computing device via a computer network, an indication that the characteristic is satisfied.

19. A method of digital image object analysis across disparate fields of view, comprising:

obtaining, by a data processing system having at least one of an object detection component, an object classification component, an object forecast component, and an object matching component, a first image generated by a first recording device, the first recording device having a first field of view;

detecting, by the object detection component of the data processing system, from the first image, a first object present within the first field of view;

determining, by the object classification component of the data processing system, a first level classification category of the first object and a second level classification category of the first object;

generating, by the data processing system, a descriptor of the first object based on at least one of the first level classification category of the first object and the second level classification category of the first object;

obtaining, by the data processing system, a second image generated by a second recording device, the second recording device having a second field of view different than the first field of view;

detecting, by the object detection component of the data processing system, from the second image, a second object present within the second field of view;

generating, by the data processing system, a descriptor of the second object based on at least one of a first level classification category of the second object and a second level classification category of the second object;

identifying, by the object matching component of the data processing system, a correlation between the first object and the second object based on the descriptor of the first object and the descriptor of the second object; and determining, by the object forecast component of the data processing system, a characteristic of at least one of the first object and the second object based on the correlation between the first object and the second object.

20. The method of claim 19, comprising:

providing, by the data processing system via a computer network, for display by an end user computing device, a first electronic document that includes an indication of the characteristic.

* * * * *